United States Patent [19]

Guisinger

[11] 3,862,355

[45] Jan. 21, 1975

[54] HELICAL SCAN WIDE BAND TAPE RECORDER APPARATUS AND METHOD

[75] Inventor: Barrett Earl Guisinger, Saratoga, Calif.

[73] Assignee: International Video Corporation, Sunnyvale, Calif.

[22] Filed: Sept. 1, 1972

[21] Appl. No.: 285,922

[52] U.S. Cl. .......... 178/6.6 P, 178/6.6 A

[51] Int. Cl. .......... G11b 15/52, G11b 5/04

[58] Field of Search .......... 178/6.6 R, 6.6 A, 6.6 P, 178/6.6 HS, 5.4 S, 5.4 CD

[56] References Cited

UNITED STATES PATENTS

| | | | |
|---|---|---|---|
| 2,921,990 | 1/1960 | Ginsburg et al. | 178/6.6 D |
| 3,016,415 | 1/1962 | Johnson | 178/6.6 A |
| 3,350,504 | 10/1967 | Takayanagi | 178/6.6 P |
| 3,535,440 | 10/1970 | Watanabe et al. | 178/6.6 A |
| 3,647,951 | 3/1962 | Rose | 178/6.6 A |
| 3,663,746 | 5/1972 | Backers et al. | 178/5.4 S |
| 3,723,643 | 3/1973 | Suzuki et al. | 178/6.6 A |

*Primary Examiner*—Harvey E. Springborn
*Attorney, Agent, or Firm*—Limbach, Limbach & Sutton

[57] ABSTRACT

A format particularly useful in a high quality video tape recorder for use in broadcast applications and other wide band signal applications such as data recording. A single mechanical structure with modifications in electronics is used for all major international television standards: NTSC (525 line, 60Hz) and PAL/SECAM (625 line, 50Hz), with no signal degradation in PAL/SECAM. Provision is made for two high quality audio tracks, a cue track, and an address track in addition to the video tracks, which are relatively short in length, each of which carries a segment of a video frame. The video track configuration permits relatively small physical dimensions for the recorder while providing excellent interchange characteristics among machines.

18 Claims, 42 Drawing Figures

HELICAL SCAN WIDE BAND TAPE RECORDER APPARATUS AND METHOD

BACKGROUND OF THE INVENTION

GENERAL

The video tape recording aspect of television broadcasting is presently dominated by the quadruplex (quad) transverse format VTR. It has become a universal standard in both 60 and 50 Hertz power areas and on all field, line and color encoding systems. The third generation versions of this machine represent nearly twenty years of continuous engineering updating. Nevertheless, the system remains cumbersome and complex with an ever increasing purchase price. The basic reason for this is that quad recording is tied to a format that is not easy to simplify. This becomes immediately apparent when one considers that no reduced versions of the quad machine have ever been seriously proposed or built. There are no 1 inch or ½ inch transverse recorders representing a scaled down replica of the original 2 inch version.

By contrast there are inherent advantages to the helical recording format. Even though several of the first helical machines also used 2 inch tape, like the quad, there was a rapid proliferation of lighter, smaller, and cheaper machines now encompassing tape widths of 2 inches, 1 inch, ¾ inch, ½ inch and ¼ inch. In addition several head configurations for helical recording have been used including single head machines in an alpha or omega wrap, dual head units in a 180° + wrap and a "head and a half" systems wheee a slightly displaced extra head fills in the drop out period with the necessary vertical sync information.

THE QUAD VTR

The reason the quad format has not lent itself to simplification is that it is intrinsically bound to extreme mechanical tolerances in order to meet the interchangeability requirements of a very stringent color television electronic signal.

The quad recorder in order to meet its physical interchangeability specifications, demands a heavy rigid deck plate to accommodate reels large enough to give playing times of up to 90 minutes. The rate of tape consumption at 15 ips of longitudinal tape flow is considerably higher than any helical recorder and the guiding accuracy required to produce precise tracking of the various recording and reproduce heads in the system is very high. The entry and exit guides that hold the 2 inch transverse tape are separated by 18½ inches and need jig plate accuracy to maintain the proper "canoe" condition as outlined in the Society of Motion Picture and Television Engineers' (SMPTE) recommended practices.

A further constraint is the need to demount a complete motor and head assembly, which must be refurbished at the factory even if only one of the five heads mounted on it should fall below standard performance levels. This added to possible mechanical failures of bearings, motor components, guide assembly, etc., leads to a rather high average cost of head replacement in quad machines.

Not the least problem is the rigid mechanical guiding arrangement at the point of head contact. The tape is held in a cupped condition matching the contour of the rotating quad head drum. The projecting video heads strike the top edge of the tape with considerable sudden shock energy, then scan through the video track with sufficient head to tape pressure to cause tape and head wear to be important economic factors in the operational costs of the machine. Tape penetration by the heads must also be controlled by a separate "female guide" servo in order to vary tension in the head area to achieve mechanical indenticity between the record and playback mode.

A number of unsuccessful attempts have been made to improve the overall efficiency of quad head assemblies with regard to head life and better interchangeability.

Ferrite head transducers have been mounted on the head drum. This effort failed, because the brittle characteristic of the ferrite head, was not compatible with the sharp shock action of the head striking the top of the tape, in a nearly perpendicular fashion. Some heads would last 1,500 hours, while others on the same drum fractured unpredictably in 10 hours. The risk of failure during an important recording, was too great to accept. The inability to utilize ferrite heads has prevented the raising of the carrier frequency which is desirable to alleviate moire distortion in PAL and SECAM systems. PAL (phase alternating line) and SECAM (sequentiel couleur a memoire) are both 625 line, 50Hz standard systems in use in certain countries outside the United States. Heretofore, VTR quality has suffered when using these systems.

Chamfering of the top edge of the female guide was attempted to relieve pressure at the contact point of head and tape. This was abandoned when it became apparent that electrical interchangeability of color recordings was adversely affected, especially with regard to "first line velocity errors," which are a problem in quad machines even with normally precise female guides.

The combination of all of these tight guiding and scanning requirements, leads to a large head/motor/-guide assembly, which must be replaced with a factory exchange unit of extreme precision, in order to fully interchange tapes. The additional and mandatory functions of audio and address code recording for editing purposes, also suffer from the long distances along the tape (9 ½inches) between the video record heads, and the record/erase heads that perform these other functions.

The quad machine is locked into a set of requirements, which make this machine more difficult and more expensive to build and operate than any helical format machine.

HELICAL VTR'S

Helical machines fall into two main categories, single or dual head. While tape widths may vary across an 8 to 1 range, the packing density of equivalent performance recorders is about the same. Tape consumption in square inches per mega-Hertz of bandpass is a function of head writing speed, gap width, tape formulation etc.

Advocates of single head helical VTR's argue that it is unquestionably simpler and cheaper to use a single head, writing one full field at a time. This makes for a machine of minimum electronics and maximum interchangeability since no head matching is ever required. There is no question about simplicity, but cost factor arguments quickly evaporate when confronted by the fact that virtually all low cost helical recorders intended for closed-circuit or domestic use are two head helical machines.

The two head machine has the advantages of a simpler threading path, elimination of the drop out period and gentler tape/head contact (especially at entry and exit points), and they seem to outweigh the cost and complexity of an extra video head. As a matter of fact, a few cassette manufacturers have gone the other way and installed three or four heads in their units to achieve other ends such as tape economy or simpler, surer scanning, further proving the relative economic unimportance of numbers of heads used per se.

Single head helical wrap machines suffer from a number of following disadvantages including the following.

A longer scan length. Since a full field must be written by the head, the scan length is a function of writing speed, and to achieve reasonable bandwidth (5.0 MHz or better) the scan length on the tape becomes 20 inches or more.

A longer scan means more tape to scanner surface friction and greater problems with dynamic tension errors, guiding, environmental effects and tape interchangeability.

A single drop out period that must use reconstituted signals to fill in the missing information. With the increasing assignment of vertical interval spaces to special test and measurement signals there is less and less room to allow for a drop out of even a few lines to accommodate the single head crossover period. Even if the drop out is held to a few lines and is stable in the vertical interval, a nonsynchronous switch would put it in the picture during the servo recovery period. Dropouts also affect the SECAM identification signal and may affect the staggered PAL burst. Also, any dropouts make a recorder unsuitable for instrumentation or data recording applications.

The circuitry needed to regenerate and gate the necessary sync pulses during dropout is not much less than that needed to amplify and equalize a second head, therefore, the economic advantage of a single head is reduced considerably.

Threading of single head machines is inherently more difficult than two head machines since the tape must wrap as close to 360° as possible.

A single head machine using an omega wrap requires a sharp bend at the entry and exit guides thereby, causing greater tape flexing and eventually faster tape deterioration.

Single head machines, again because of the inherently long tape path are subject to several second order effects such as scrape flutter and tracking wobble due to differential tensions along the tape path over the scanner.

Even if a self-threading mechanism is used to simplify operation of the VTR, the tape cannot be removed without completely rewinding into the original holder. This factor severely limits potential cartridge or cassette design of a single head helical format.

Auxiliary tracks such as audio, address codes, control and cue are hampered by a single video head format. If an omega wrap is used the tape entry and exit guides must produce a very sharp junction, so as to keep the crossover time short. This arrangement produces severe handling of the tape at the entry/exit point. If an alpha wrap is used then video must either be written over all or some of the auxiliary tracks or gated off where the tracks exist along the edge of the tape. If gated the off period must be kept as short as possible, thereby leaving room for only very narrow longitudinal tracks. Either way, it is a poor compromise at best.

Prior art two head helical machines have also suffered from numerous shortcomings. One typical machine two head helical VTR lays down one complete field per head pass thus requiring a long scan length with all the attendant disadvantages of long scan length mentioned above.

A further problem inherent in prior art VTR's is that different typical parameters (longitudinal speed, scanner speed, writing speed) are required for the different international television standards (NTSC, PAL, SECAM) (the NTSC system, devised by the National Television System Committee is the color television standard in 525 line, 60 Hertz countries, including the United States) so that a single mechanical structure could not be built that would be usable for all standards. Thus, manufacturing costs were increased in order to produce variant models for the different standards.

In summary, it can be said that helical machines for full broadcast applications and meeting quad specs, have not yet been successfully demonstrated. Notwithstanding, efforts by the major companies since the late fifties to produce such a machine in either a 2 inch or 1 inch format, the results have been unacceptable to broadcast organizations, because none of these machines offered the electrical performance characteristics or the editing convenience of the quad machine.

SUMMARY OF THE INVENTION

The improved helical format according to the present invention, for the first time combines the advantages of the helical format with the performance characteristics of the best quadruplex recorders.

Some of the advantages inherent in the improved helical format according to the present invention are as follows.

The same mechanical structure is used for both an NTSC and a PAL/SECAM version of the machine. A single basic machine can be used for both PAL and SECAM with modifications only to the electronics portion of the machine. The format permits the identical writing speed, longitudinal speed and substantially the identical scanner speed for both versions. Due to a minor change in the NTSC vertical frequency, the scanner speed is slightly different. Thus, a single mechanical structure can be manufactured which requires only minor variations in electronics to accommodate all three major international television standards.

Unlike the quad, performance in the PAL/SECAM versions is not degraded with respect to NTSC since the same writing speed is used. Also, as explained further below the use of "super high band" in PAL/SECAM provides a new high performance standard in PAL/-SECAM due to decreased moire distortion.

Two inch tape is employed. When compared to 1 inch tape of the same mechanical characteristics, the 2 inch tape has double the longitudinal tensile strength and at least three times the transverse rigidity. These two factors combine into a minimum 4 to 1 advantage where tape exchange is concerned.

Edge slitting tolerances for 1 inch and 2 inch tape are the same however, equal slitting errors would have only half the effect on a 2 inch tape. Guiding and tracking of longitudinal tracks is therefore, better on 2 inch tape.

Scan length is only about 5¼ inches around the scanning assembly. Because the image is segmented by two heads and continuous video information is available from the tape, there is no need to write a full field with each head as on a single head machine. By comparison a single head helical VTR with the same writing speed would require 30 inches of scan length. There is at least a 5 to 1 ratio advantage here also, for the improved helical format over one inch helical recorders. The combination of the three last-mentioned advantages produce at least 20 to one improvement of the 2 inch, two head approach to the 1 inch, one head system. This will result in guaranteed interchangeability under a wide variety of environmental changes, record/playback condition variations and even an acceptable range of operational errors in setting up and running the VTR.

The 2 inch wide tape with 5¼ inch scan length contributes to better guiding, better tracking, and better interchangeability, between machines than the 1 inch scan format.

The shorter scan length also requires a smaller scanner thus improving scanner servo response resulting from less scanner inertia. A smaller scanner also results in a smaller top plate and smaller overall physical size of the VTR.

The shorter scan length also means less static friction between tape and scanner and less dynamic tension variations between the entry and exit guides. In particular, this would minimize track curvature and assure perfect tracking of video tracks from end to end.

The 180°+ tape wrap (an "omega wrap") allows for large radius inlet and outlet guides and small incident angle tape to head contact at entry and exit points. This contributes considerably to head and tape longevity and reduces signal perturbations at the start and end of each head scan of the video tracks.

The approximately 19° track angle (pitch) segments the video image into 52 or 53 line increments (tracks). Both NTSC and PAL/SECAM versions have an even number of tracks per frame (10 in NTSC, 12 in PAL/SECAM). As explained further herein, this relationship is one of the features making possible the same mechanical structure for all TV standards and for allowing scanning erase. Scanning erase is not possible in the quad format which must start a full video erase about 38 frames before the video heads. Further, in comparison with the quad VTR, which has 16 line segments, there is a 3 to 1 advantage in terms of visibility of any "first line velocity errors" or other head cyclic defects by employing 52/53 line segments.

In the case of NTSC signals, a further improvement is obtained through the use of odd segmentation, so that, successive heads cover the same segment on alternate fields. This is not possible in the quad machine since the fastest possible rate is 15Hz which causes visible flicker. Whereas, in the present improved helical format the rate is 30Hz which cannot be observed by the eye. Odd segmentation enhances subjective cancellation of differential phase between heads, differential noise and differential chroma level from the corrective network.

The 2 inch width and 180° scan permits adequate space at the upper and lower edge of the tape for all necessary or optional auxiliary tracks that end users require. Two high quality sound channels are provided, one lower quality audio channel for cueing purposes and a separate track for address code recording, necessary for precision editing. The standard servo control track and video track complete the total requirements of the recorder.

In comparison to the quad only two heads need to be equalized instead of four. One head is considered the "boss" with respect to burst amplitude and is not automatically controlled. Burst amplitude from the other head is sampled and compared to the first head burst amplitude and adjusted to match.

The video tracks are 6 mils wide with a 3 mil guard band. While this is somewhat narrower, than a quad machine, the use of hot pressed ferrite (HPF) heads made possible by the improved helical format adequately overcompensates. The efficiency and flat response of HPF heads out to 18 MHz coupled with a writing speed very near that of the quad (1,500 ips vs. 1,560 ips), permits performance not only at normal high band frequencies of 7 to 10 MHz, but also at super high band frequencies of 9 to 12 MHz. This area of performance exceeds the quad machines in at least one important area of performance namely, the moire characteristic of PAL and SECAM standard. Even at super high band frequencies for carrier and deviation, the wavelengths on tape are over 100 micro inches for all necessary reproduced signals.

The relatively short scan length of the video tracks assures good RF envelope recovery and smooth transition between successive heads. The heads operate in low impedance (swamped) modes, eliminating resonance matching requirements and assuring uniformity of signal characteristics between heads.

Audio tracks on the VTR according to the present invention have several significant advantages over the quad format.

All audio tracks are grouped at the top edge of the tape well away from any crosstalk problem with the saturated recording tracks that carry servo control and address code information.

There are two full quality audio program tracks instead of one. The two audio tracks can be used for alternate languages, stereo sound, background music scoring, transfer editing, and sound updating without destroying the original sound track.

A cue track of limited sound quality is included between the two analog audio program tracks. The cue track on the quad was adjacent to the control track recording and suffered from saturation recording interference, which required notch filtering to remove.

All audio tracks benefit from the longitudinal orientation of the video tape, thus providing an inherently better performance characteristic in the sound channels. Quad video tape is oriented transversely and deteriorates sound performance because the accicular magnetic particles are at right angles to the desired position for optimum longitudinal recording of sound tracks.

The audio program tracks on the VTR according to the present invention are both wide track format with the lower track being sufficiently displaced from the edge of the tape to be virtually immune from guiding errors, tape mechanical tolerance errors and tape edge damage. With the use of linear phase electrical characteristics the main program sound track exceeds any present audio channel on any broadcast VTR.

The control track is as far inboard from the bottom edge of the tape as possible to remove it from edge effects and provide a stable control track signal. Further, the control track head is located on the scanner drum instead of away from the head assembly as in the quad VTR. Thus, less adjustment due to tape stretching, etc., is required.

Only some machines will require the optional address code track, which is placed adjacent to the bottom edge of the tape. Since this is a track of great redundancy, it is possible to use peripheral electronic "fail safe" tenhniques to assure adequate address code recovery, even under difficult conditions of tape edge damage or lost information.

All longitudinal tracks on the VTR according to the present invention are separately recordable, eraseable, and editable, without effecting the video recording or each other. Full editing capability, using the assemble or insert mode for video only is possible with a simple accessory electronic editor. Address code editing can be done with an optional accessory. Editing can be any combination of video, audio, cue or address tracks.

Other advantages and features of the improved helical scan VTR format according to the present invention will become apparent as the following detailed description is read and understood. While the invention is disclosed in the environment of television signal recording and playback, it is to be understood that the invention is also usable for the recording and playback of other wide band signals including data signals.

DESCRIPTION OF THE PREFERRED EMBODIMENTS

Figure 1:
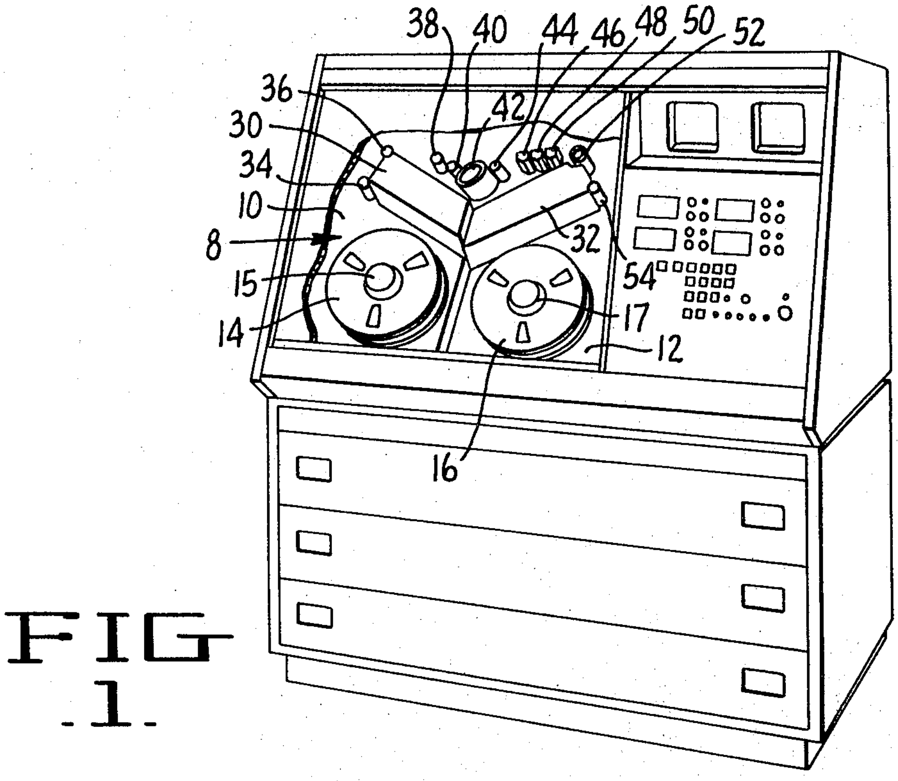
FIG. 1 is a perspective view of a videotape recorder console suitable for recording and playing back the improved videotape format according to the present invention.
Figure 2:
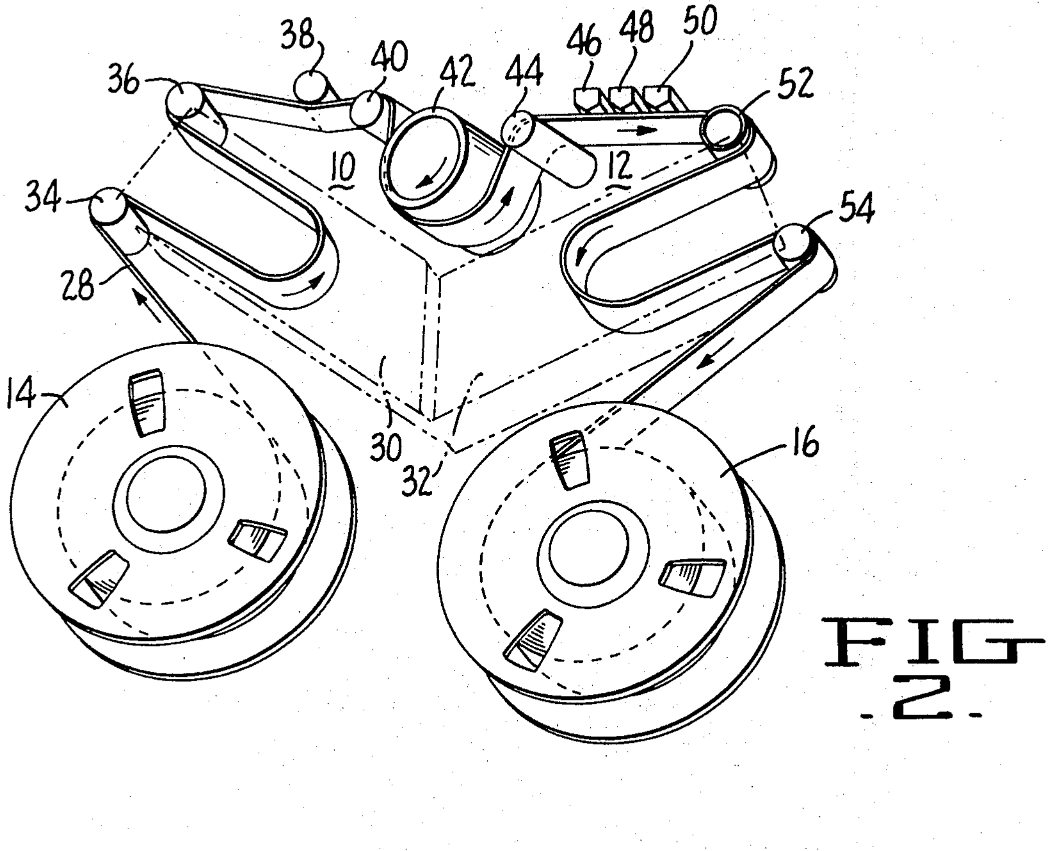
FIG. 2 is a perspective view of a portion of the videotape recorder deck or transport assembly shown in FIG. 1.

Referring now to FIGS. 1 and 2, perspective views of a video tape recorder deck or transport assembly 8 suitable for recording and playing back the improved videotape format according to the present invention are shown. The assembly includes an upper deck plate portion 10 and a lower deck plate portion 12: due to the nature of the helical scan wrap around scanner assembly 42, the supply and take up portions of the deck assembly 8 are displaced in height. A supply reel 14 is held by a hub 15 fixed to the upper deck plate 10. Video tape 28 from supply reel 14 passes around an air bearing guide post 34 and loops into a first vacuum column 30. Tape 28 comes out of vacuum column 30 around a further air bearing guide post 36 to a scanner assembly air bearing guide post 40. A full tape width bulk erase head 38 is located between posts 36 and 40 so as to contact the tape 28. The scanner assembly 42, described in further detail below, along with the input and output air bearing guide posts 40 and 44 form an angle of about 19.55° with the plane of deck plates 10 and 12 in order to provide the desired video track angle of about 19.55°.

Tape 28, guided by posts 40 and 44 forms a wrap of about 188.57° around the scanner assembly 42. An air bearing is also provided around the scanner assembly 42. A vacuum collar (not shown) separates the tape 28 from the scanner assembly 42 when the tape is stopped. After passing around post 44, the tape 28 contacts three record/playback head stacks 46, 48 and 50 as described further in connection with FIGS. 9A, 9B and 9C. Head stacks 46, 48 and 50 carry various audio, audio cue, address code, video confidence and erase heads as will be explained below.

Tape 28 then passes around capstan 52, loops into a second vacuum column 32, and passes around a further air bearing guide post 54 to take up reel 16 held by hub 17 on the lower deck plate 12. Vacuum columns 30 and 32 cooperate in tandem to provide a variable vacuum pull on each side of the scanner assembly 42, thus permitting a variable tape tension. The entire tape path has very low friction due to the use of air bearing members and the use of vacuum columns for tension control. Further details of the deck assembly including the vacuum columns 30, 32 and the scanner assembly 42 are disclosed in copending application of Franc S. C. Mo and Vernon R. Natwick, entitled Magnetic Tape Transport System, Ser. No. 285,923 filed Sept. 1, 1972 and assigned to the same assignee as this application, now abandoned in favor of copending continuation-in-part application, Ser. No. 354,227, filed Apr. 25, 1973.

Figure 3:
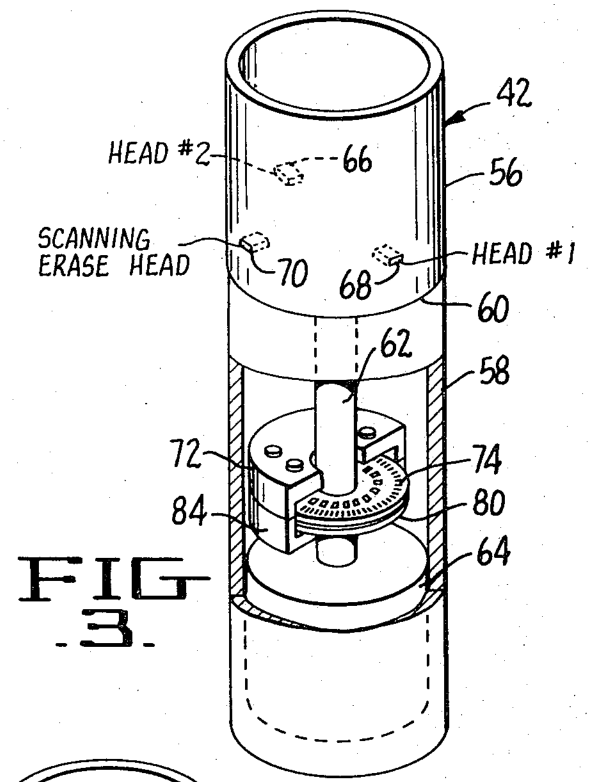
FIG. 3 is a partially cut-away schematic perspective view of a scanner assembly used in the transport assembly of FIG. 2.
Figure 4:
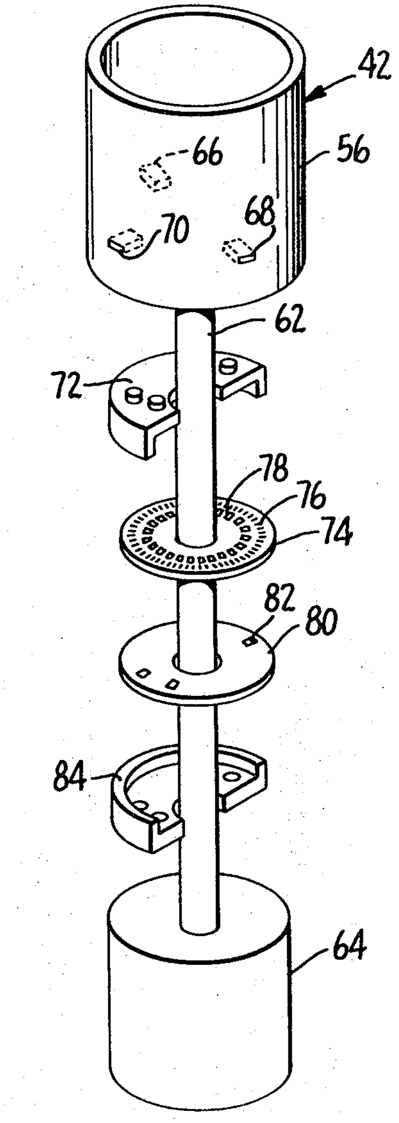
FIG. 4 is an exploded perspective view of FIG. 3.
Figure 5:
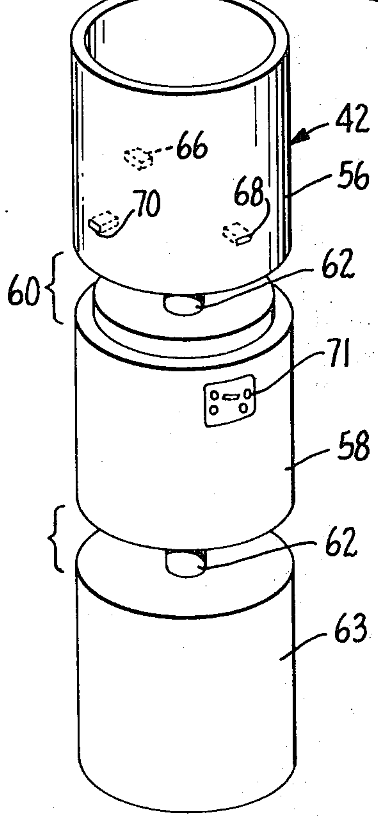
FIG. 5 is a further schematic perspective view of the scanner assembly of FIG. 3, showing its major subassemblies and the location of the control track head.

Referring now to FIGS. 3, 4 and 5 the scanner assembly 42 is shown in greater detail, although schematically, omitting mechanical details not necessary to the understanding of the present invention.

Scanner assembly 42 comprises a stationary drum portion 58 that is fixed to the deck plates 10 and 12. A housing 63 holds a motor 64, described in greater detail hereinafter, driving a central shaft 62 that carries a rotating drum portion 56 which is spaced apart from the stationary drum 58 by a small gap 60. Drums 56 and 58 are both cylindrical and their outer surface dimensions are machined for close tolerance with each other, although as explained below, due to the configuration of the scanner assembly 42, the tolerance is not as exacting as would typically be required.

A control track record and playback head 71 is located on the fixed drum 58 in order to contact the tape 28 while wrapped around scanner assembly 42, thus reducing errors due to tape stretch and mechanical tolerances when the control track head is separated a distance from the video head assembly.

Three heads, a first video head 66, a second video head 68 and a scanning erase head 70, are carried in the upper drum in a single plane perpendicular to the shaft 62. The tape contacting tips of the heads extend slightly beyond the drum periphery in order to contact the tape 28 when it is wrapped around the scanner assembly 42. The scanning erase head is dimensioned to erase two video tracks per revolution. Video heads 66 and 68 are hot pressed ferrite type having frequency responses well beyond 12MHz.

A rotating optical disc 74 is fixed to shaft 62 and therefore rotates in synchronism with the rotating drum 56. Disc 74 carries an outer set of indicia 76 for use in driving the motor, and an inner set of indicia 78 to provide tachometer pulses and an indicator of the video head 66 (head 1) position, as will be explained further below in connection with FIGS. 6A, 6B and 6C.

A static (stationary) disc 80 having slots 82 is positioned in juxtaposition below the rotating disc 74. The slots operate in conjunction with the rotating disc 74 and sets of light sources and light sensors to provide desired signals. Further details of the static disc 80 are set forth in the discussion of FIG. 7.

A horseshoe shaped stationary member 72 is located adjacent and above the rotating disc 74. Member 72 holds a plurality of light sources as will be shown in further detail in FIG. 8.

A second horseshoe shaped stationary member 84 is located adjacent and below static disc 80. Member 84 holds a plurality of light sensors as will be shown in further detail in FIG. 9.

Figures 6A, 6B, 6C, 7, 8, 9:
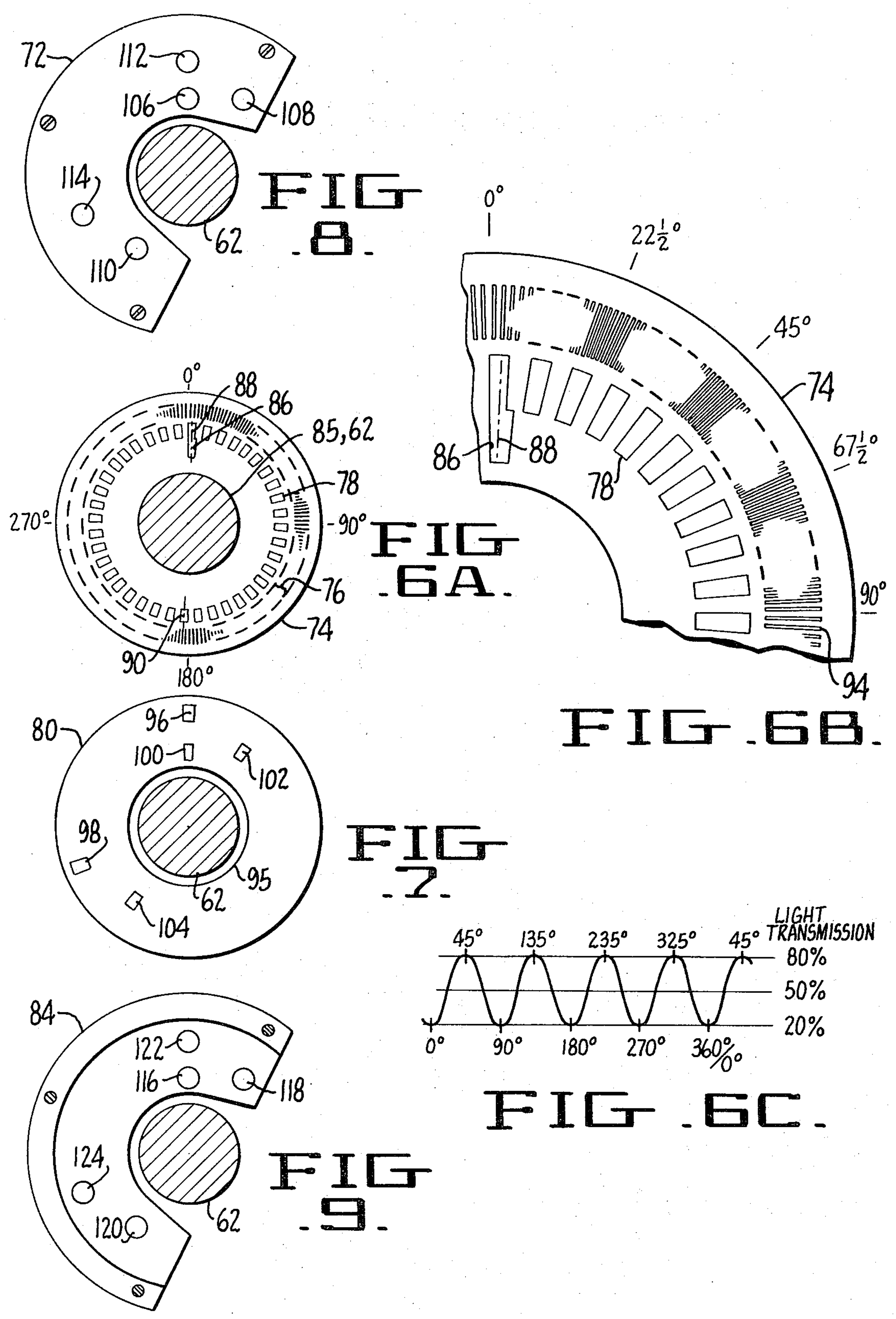
FIG. 6A is a plan view of the rotating tachometer disc used in the scanner assembly of FIG. 3.
FIG. 6B is an enlarged section of the tachometer disc of FIG. 6A.
FIG. 6C is a sinusoidal waveform generated by the tachometer disc of FIG. 6A.
FIG. 7 is a plan view of the stationary tachometer disc used in the scanner assembly of FIG. 3.
FIG. 8 is a plan view of a light source holder used in the scanner assembly of FIG. 3.
FIG. 9 is a plan view of a light sensor holder used in the scanner assembly of FIG. 3.

Referring now to FIG. 6A and 6B the details of the rotating optical disc 74 are shown in greater detail. Disc 74 is circular with a central circular cutout 85 for drive shaft 62. Except for the slots to be described, the disc 74 is opaque to light. A series of 40 trapezoidal slots or optically clear areas comprising indicia 78 are equally spaced around the disc. Each area 78 is of the same size and is located the same radial distance along the disc 74. One area 78 has a further slot or clear area 86 abutting it. Slot 86 is used to provide an indication of the video head 66 (head 1) position. Disc 74 is precisely aligned with the rotating drum 56. Line 88 indicates the centerline and gap of the video head 66 (head 1). One hundred and eighty degrees away, line 90 indicates the centerline and gap of the video head 68 (head 2). The precise 180°separation of the two video heads is critical in order to avoid "dihedral" errors in record and playback.

The further set of indicia 76, located outside indicia 78 are intended to provide a sinusoidal light transmission. The sinusoidal waveform results from providing narrow slots 94 between a pair of radial distances on the disc 74 with the adjacent spacing between slots 94 varied so that the light transmission varies in the desired sinusoidal pattern. Although not shown for clarity in FIG. 6B, the slots 94 are continuously located around the disc with their spacing varied according to the desired sinusoidal waveform shown in FIG. 6C. Thus, the mark-space ratio defined by slots 94 produces a sine wave output as the disc 74 rotates.

In FIG. 7 the static disc 80 is shown in greater detail. The disc is circular and substantially identical in diameter to disc 74. A central circular aperture 95 is provided for mounting. The details of mounting the discs 80 and 74 are omitted as nonessential to the invention's understanding. Disc 80 is opaque to light and a pair of viewing apertures 96 and 98 located radially to line up with the slots 94 in disc 74 provide a look at sine and cosine variations in the slots 94 because the viewing apertures 96, 98 are spaced apart by 112½°, the physical distance necessary to provide a 90°electrical spacing for simultaneous sine and cosine readings from a single sine wave. A viewing aperture 100 is located to read the area 86 indicating the video head 66 (head 1). A pair of viewing apertures 102 and 104, located 180° apart are positioned to read the slots 78.

FIGS. 8 and 9 show members 72 and 84, respectively, in greater detail. Member 72 holds a plurality of light sources in the correct position in relation to the fixed disc 80, the rotating disc 74, and the locations of the light sensors in member 84 so that signals are provided corresponding to 1. each pass of the slot 86 over viewing area 100 to give a video head 66 (head 1) pulse,
2. a pair of tachometer signals at 40 times the rotating disc 74 rate as slots 78 pass over viewing areas 102 and 104, and
3. simultaneous sine and cosine signals as the sine wave slots 94 pass over viewing areas 96 and 98. It will be apparent that many types of light sources and sensors can be used, for example, light emitting diodes (LED's) and phototransistors. LED 106 cooperates with phototransistor 116 to provide a head 1 pulse once every rotation of disc 74; LED's 108 and 110 cooperate with phototransisters 118 and 120, respectively, to provide two pairs of tachometer pulses at 40 times the disc 74 rotation rate; LED's 112 and 114 cooperate with phototransistors 122 and 124 to provide the sine and cosine signals.

Referring now to FIGS. 10A – 10F, details of the longitudinal head stacks 46, 48 and 50 are shown.

Figure 10B:
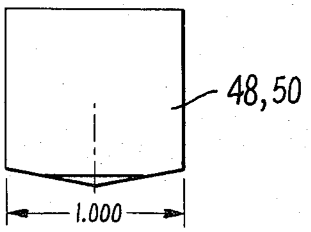
FIGS. 10A – 10C show front elevation, top plan and side elevation views, respectively, of the record/play head stack and monitor head stack.
Figure 10A:
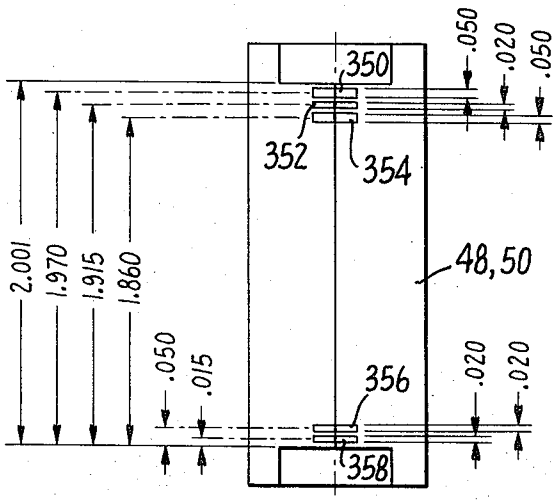
Figure 10C:
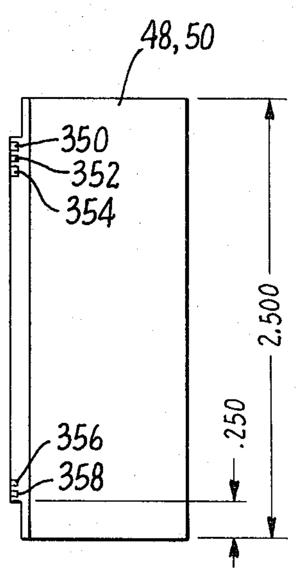

FIGS. 10A – 10C show front elevation, top plan and side elevation views, respectively, of the record/play head stack 48 and monitor head stack 50. Head stacks 48 and 50 are identical. Both stacks 48 and 50 include five heads disposed dimensionally as shown in the drawing, including in order from top to bottom: audio No. 2 head 350, cue head 352, audio No. 1 head 354, control track head 356, and address track head 358. The head locations are positioned to lay down the tracks shown in FIG. 11.

Figure 10E:
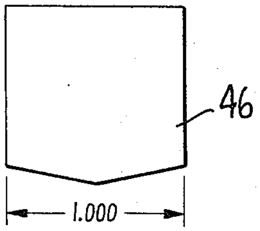
FIGS. 10D – 10F show front elevation, top plan and side elevation views, respectively, of the erase head stack.
Figure 10D:
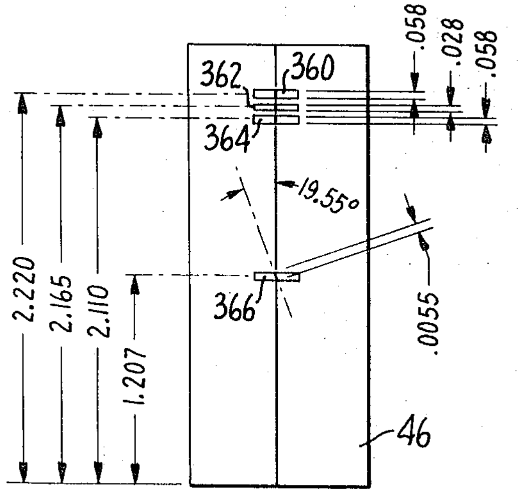
Figure 10F:
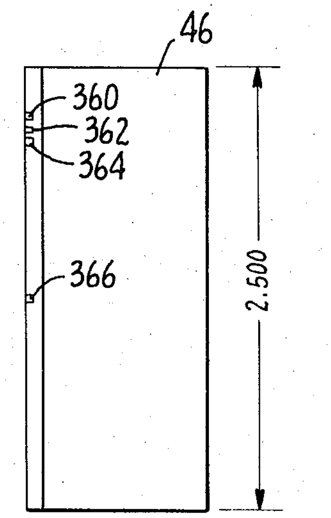

FIGS. 10D – 10F show front elevation, top plan and side elevation views, respectively, of the erase head stack 46. Stack 46 includes four heads disposed dimensionally as shown in the drawing, including in order from top to bottom: audio No. 2 erase head 360, cue erase head 362 and audio No. 1 erase head 364. A further head 366 having its gap angled at 19.55°, the angle of the video tracks is used as a playback video confidence head to assure that video has been recorded. There are no erase heads required for the control track or address tracks because these tracks are saturated recorded thereby erasing any previous information.

Figures 11, 12:
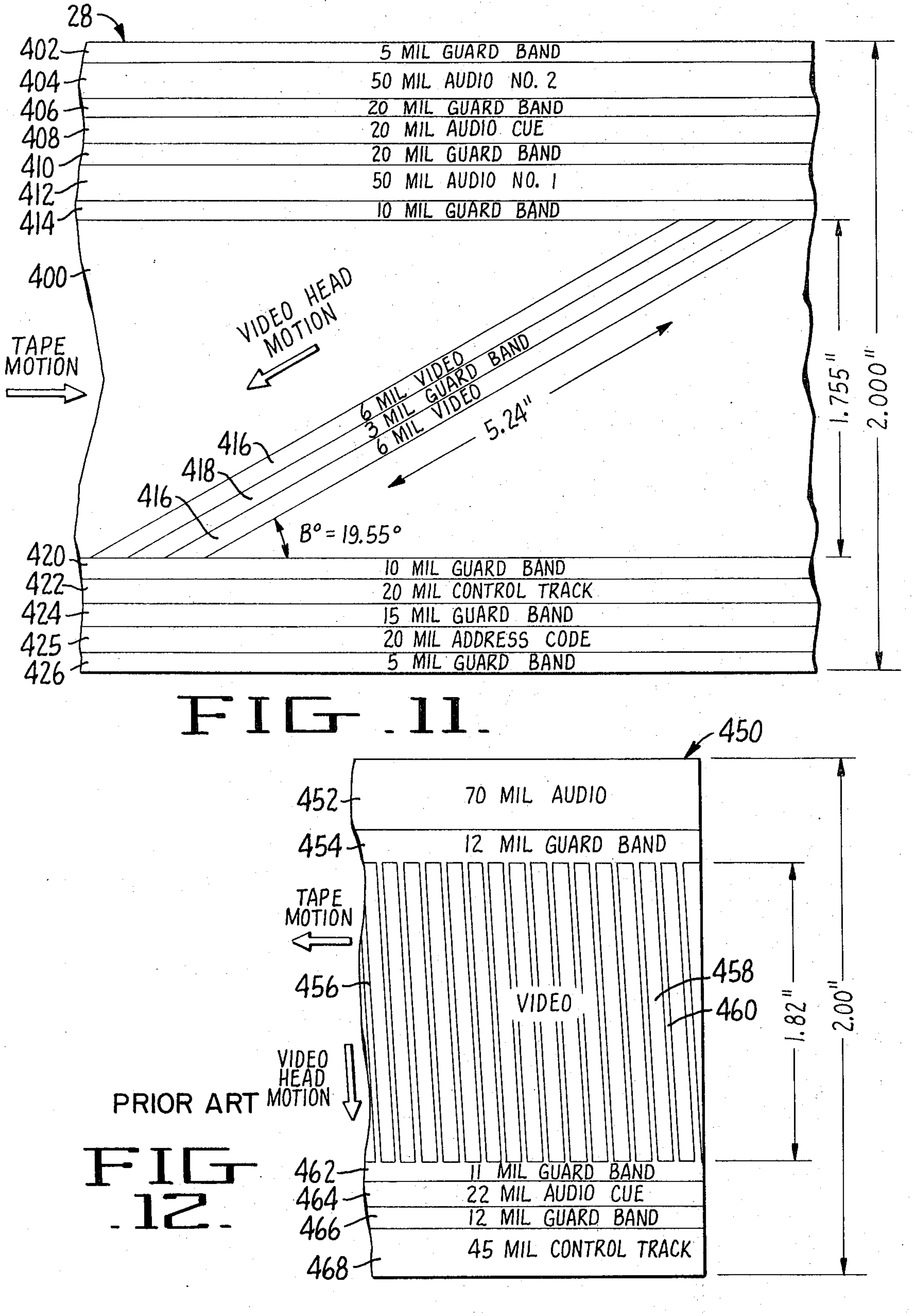
FIG. 11 PRIOR ART FIG. 12
FIG. 11 shows the broadcast quality helical scan format recorded on tape in accordance with the teachings of the present invention.
FIG. 12 shows the prior art quadruplex format recorded on tape.

FIG. 11 shows the format recorded on the tape 28 by the apparatus shown and described in conjunction with FIGS. 1–10 when the following dimensions, speeds and rotational rates are employed:

| | |
|---|---|
| angle between video heads 66, 68 and tape 28: | 19.6° |
| tape 28 longitudinal speed: | 8 ips |
| scanner 42 rotational rate (in NTSC the scanner rate is 58.94/60 × 9000 rpm): | 9,000 rpm |
| scanner 42 diameter: | 3.17" |
| tape 28 wrap around scanner 42: | 188.57° |

Also, as explained further below, each video field is broken up into segments so that each video track carries only a portion of each video field. In NTSC (525 line, 60 Hertz) there are five scan segments; in PAL and SECAM (625 line, 50 Hertz) there are six scan segments. In both systems, there are 52 or 53 horizontal video lines per segment.

Tape 28 is nominally 2 inches in width, with the video track area 400 occupying 1.755 inches generally in the center of the tape. Beginning from the top edge of tape 28, a 5 mil guard band 402 is provided in order to protect the next adjacent 50 mil audio track 404 (audio "No. 1") from edge effects. Next a 20 mil guard band 406 separates audio track 404 from a 20 mil audio cue track 408. A 20 mil guard band 410 separates the audio cue track 408 from a 50 mil audio track 412 (audio "No. 1"). A 10 mil guard band 414 separates audio track 412 from the video track area 400. Since the video tracks are not parallel to the audio tracks, only a 10 mil guard band is necessary to avoid crosstalk between track 412 and the video tracks in area 400.

The video tracks 416 are 6 mils wide, separated by 3 mil guard bands 418. Tracks 416 form an angle B of about 19.55° to the audio tracks and tape edge. The length of each video track is 5.243 inches. Taken with the other physical parameters, this results in a video writing speed (head/tape speed) of 1,500 ips in both NTSC and PAL/SECAM systems.

Below the video record area 400 is a further 10 mil guard band 420, followed by a 20 mil control track 422. A 15 mil guard band 424 separates track 422 from a 20 mil address code track 425. A 5 mil guard band 426 separates the address code track 424 from edge effects.

In order to fully appreciate the improved high broadcast quality videotape format according to the present invention, a comparison to the present industry standard quadruplex format as shown in FIG. 12 is useful.

A 2 inch width tape is also used, with a longitudinal tape speed of 15 ips and a video writing speed of 1,561 ips. Four video heads are used on a 14,400 rpm rotating wheel. The video frames are divided into segments of about 16 lines per video track. Only one high quality audio track is provided, one cue track and one control track. The video tracks are longitudinal and are therefore substantially perpendicular to the tape. Since the tape particles are aligned for optimum video performance, the audio track quality necessarily suffers.

Referring now to the details of FIG. 12, a 70 mil audio track 452 is located adjacent the tape edge of the tape 450. Since no edge guard band is provided the track is susceptible to edge effects and consequent degradation of performance. A 12 mil guard band 454 is provided between audio track 452 and the video track record area 456. A width of 1.82 inch is provided for the video track record area 456. The video tracks 458 are 10 mils wide separated by guard bands 460 that are 5.6 mils wide. The tracks form a 90° 17′ angle with the tape edge. An 11 mil guard band 462 separates the video track area 456 from the 22 mil audio cue channel 464. A 12 mil guard band 466 separates the audio cue track 464 from a 45 mil control track 468. As is the audio track 452, the control track 468 is also located adjacent an edge making it susceptible to edge effects. A stable control track is essential to proper playback and the quad format control track location coupled with the location of the control track head away from the video head wheel causes some problems in quad playback.

According to the present invention, the control track is located well inside the tape edge and the control track head is located on the scanner assembly itself to minimize errors from tape stretching. Thus, a stable control track signal is provided. The present invention provides two high quality audio tracks, instead of one medium quality audio track in the quad format. Also, the present invention provides an address code channel, which is not provided in the quad format, for use in automating or semiautomating the tape deck. For example, the standard SMPTE address code may be used to provide automatic searching for a particular location on the tape.

By using ferrite heads in the video tape recorder apparatus employing the format of this invention, it is possible to employ a significantly higher FM carrier frequency for use in PAL/SECAM systems. The quadruplex VTR suffers from degraded performance standards in PAL/SECAM operation.

Figure 13:
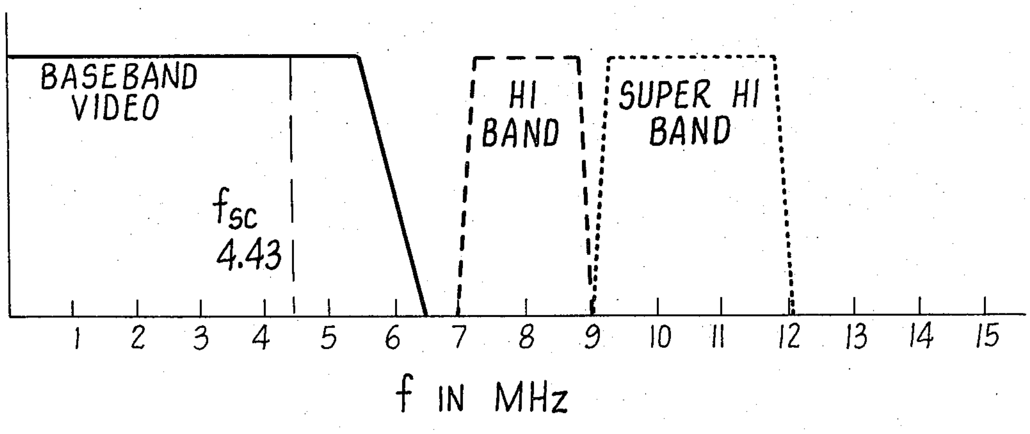
FIG. 13 is a frequency plot showing a baseband PAL/SECAM video spectrum, the 37 high-band" carrier deviation for recording PAL/SECAM in quadruplex VTR's and the "super-high-band"carrier deviation for recording PAL/SECAM according to this invention.

Referring to FIG. 13, a graphical representation of the frequency spectrums for a baseband PAL/SECAM signal, the quadruplex PAL/SECAM record spectrum, and the PAL/SECAM record spectrum of a VTR using the present format are shown. The baseband signal extends to 6 MHz, +, with the chrominance subcarrier, $f_{sc}$, at about 4.43 MHz. In the quadruplex VTR, the PAL/SECAM signal is recorded as an FM signal deviating between about 7 and 9 MHz. This is generally referred to in the industry as "high band." The deviation is kept relatively narrow in an effort to reduce moire distortion, however, reduction of the deviation to 2 MHz for PAL/SECAM, which is typically 3 MHz for NTSC systems, results in decreased signal-to-noise ratio. Moire distortion is a greater problem in PAL/SECAM systems where the chrominance subcarrier is at a substantially higher frequency (4.43 MHz) than in the NTSC system (3.58 MHz). Generally speaking, moire is reduced by increasing the FM carrier frequency. However, the nature of the quadruplex recording format prohibits the use of heads that can handle higher carrier frequencies.

According to the present format, the PAL/SECAM signals are recorded in a "super high band spectrum" wherein the FM carrier deviates between about 9 and 12 MHz. Thus, the signal-to-noise ratio of NTSC is retained and the higher carrier frequencies reduce moire distortion.

Moire distortion caused by spurious components generated in the VTR recording process are defined by known relationships. For example, the folded second order sideband and folded third order sideband are the most critical spurious components in terms of picture degradation.

The folded 3rd order sideband is defined by the relationship:

$$f_s = 2f_c - 3f_{sc} ,$$

where $f_s$ is the spurious frequency, $f_c$ is the instantaneous carrier frequency, and $f_{sc}$ is the chrominance subcarrier frequency. Taking worse case conditions ($f_c$ = black level), in the PAL/SECAM quad:

$$f_s = 2(7.66) - 3(4.43)$$

$$f_s = 15.32 - 13.29 = 2.03 \text{ MHz.}$$

Thus, a spurious frequency at 2.03 MHz is generated within the 0 – 6 MHz baseband PAL/SECAM signal. Whereas for the worse case condition in the PAL/SECAM application of the present format:

$$f_s = 2(9.9) - 3(4.43)$$

$$f_s = 1.98 - 13.29 = 6.51 \text{ MHz.}$$

The spurious frequency at 6.51 MHz is outside the filter skirts of the playback electronics, hence the distortion is avoided.

Figure 14:
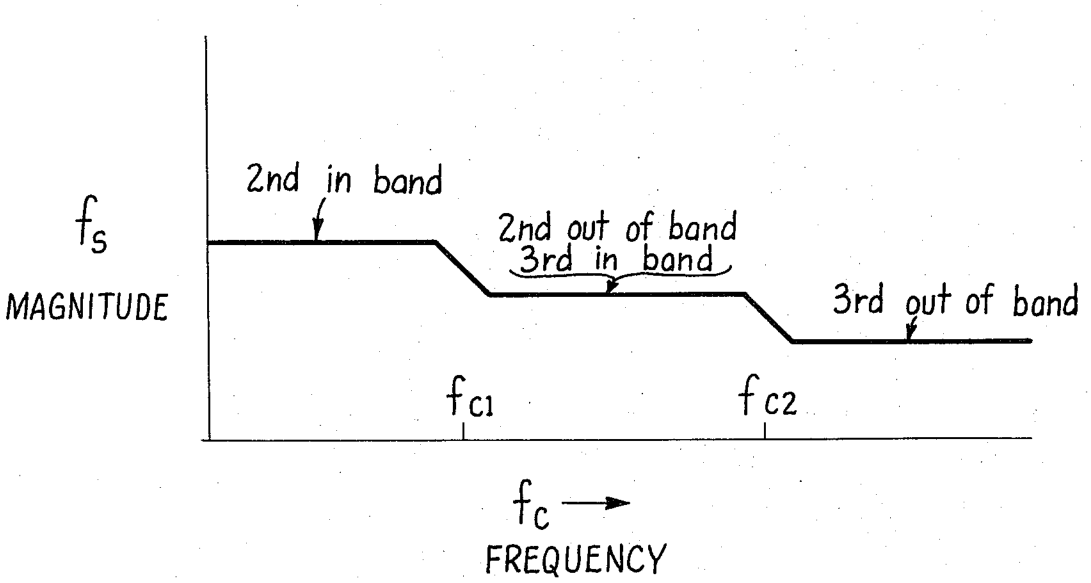
FIG. 14 is a frequency plot showing moire distortion shelves.

In FIG. 14, a general plot of $f_s$ versus $f_c$ is shown, indicating the manner in which moire distortion improves in "shelves" as the carrier frequency is raised. Up to a frequency $f_{c1}$, the folded second order sideband is within the baseband. From $f_{c1}$ to $f_{c2}$ the folded second order sideband is outside the baseband but the folded third order sideband is inside; beyond $f_{c2}$ the folded third order sideband is outside the baseband. The quadruplex PAL/SECAM VTR falls in the shelf between $f_{c1}$ and $f_{c2}$, whereas the quadruplex NTSC VTR and both the NTSC and PAL/SECAM VTR's using the format of this invention fall in the shelf beyond $f_{c2}$. Thus the same high performance standards ae provided for all major television systems, NTSC, PAL and SECAM, by the present invention.

It is also possible to employ the super-highband frequencies (9–12 MHz) for recording NTSC signals according to this invention. By doing so, the same modulator/demodulator electronics may be used for both NTSC and PAL/SECAM machines while improving yet further the moire in NTSC so that the 4th order folded sideband falls outside the demodulated baseband signal.

Figure 15A:
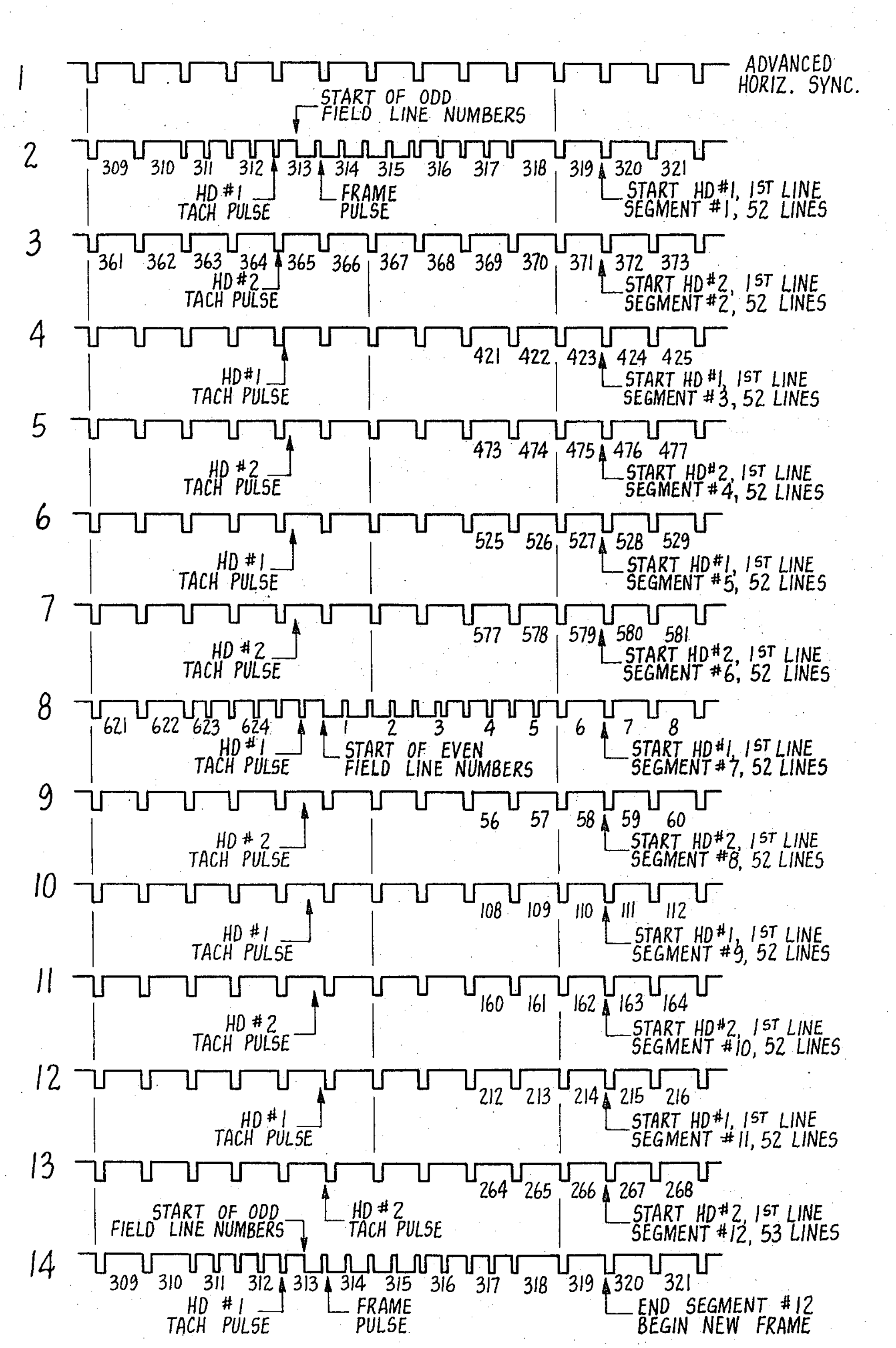
FIG. 15A is a graphical presentation of the video head switching sequence for the 50 Hertz, 625 line PAL/SECAM system version of the present invention.

FIG. 15A shows the head switching sequence for the 50 Hz, 625 line PAL and SECAM system version of the present invention. As mentioned above, each video frame is divided into 12 segments, each segment occupying a single video track.

In order to clarify the timing relationships among (1) the tach pulses, (2) the advanced off-tape horizontal sync pulses (as explained further in connection with FIG. 20A, below), and (3) the head switching segments in playback, the Figure shows the synchronizing pulses adjacent the scheduled head switch times. The head switch times shown in the diagram are those set by the logic circuit described in FIG. 18, below. Line (1) of the Figure shows the advanced horizontal sync pulses (of FIGS. 17–20) which are synchronous with the other sync pulses of this Figure. As shown in the Figure, the Head 1 tach pulse is the positive going edge of the 150 Hz tach signal (see FIG. 17B) from scanner disc 74 and the head 2 tach pulse is the negative going edge of the 150 Hz tach signal. In line (2), the head 1 tach pulse occurs at the start of horizontal line 313 (of the 625 lines per frame). Line 313 is within the vertical interval which includes the frame pulse (the second broad vertical pulse). It will be noted that the succeeding vertical interval is offset ½ horizontal line (due to the odd number of lines — 625) so that the vertical pulse edges do not coincide with the horizontal pulses. The beginning of segment 1 starts six horizontal lines after the frame pulse. Head 1 is active during segment 1. The logic disclosed in FIG. 18 provides the head switch at the beginning of line 320 and throughout this timing diagram. The head activity segments proceed as follows:

| Segment | Head Active | Lines Active | Total Lines |
|---|---|---|---|
| 1 | 1 | 320–372 | 52 |
| 2 | 2 | 372–424 | 52 |
| 3 | 1 | 424–476 | 52 |

-Continued

| Segment | Head Active | Lines Active | Total Lines |
|---|---|---|---|
| 4 | 2 | 476–528 | 52 |
| 5 | 1 | 528–580 | 52 |
| 6 | 2 | 580-7 | 52 |
| 7 | 1 | 7–59 | 52 |
| 8 | 2 | 59–111 | 52 |
| 9 | 1 | 111–163 | 52 |
| 10 | 2 | 163–215 | 52 |
| 11 | 1 | 215–267 | 52 |
| 12 | 2 | 267–230 | 53 |

It will be noted that the head 1 and head 2 tach times "drift" over one horizontal line during each frame and then return. This results from the non-integral relationship between the 150Hz/300 Hz tach pulses and the 15,625 Hz horizontal frequency. By providing a 53 line twelfth segment, the additional odd line is accommodated during the vertical interval and the tach signals and horizontal pulses are brought into synchronism—in effect the H/12 shift (where H is a horizontal line) each segment results in the tach signal "catching up" with the horizontal pulse for line 313. It will also be noted that the heads do not alternate on corresponding segments in each field (segments 1–6 are in one field, segments 7–12 another).

Figure 15B:
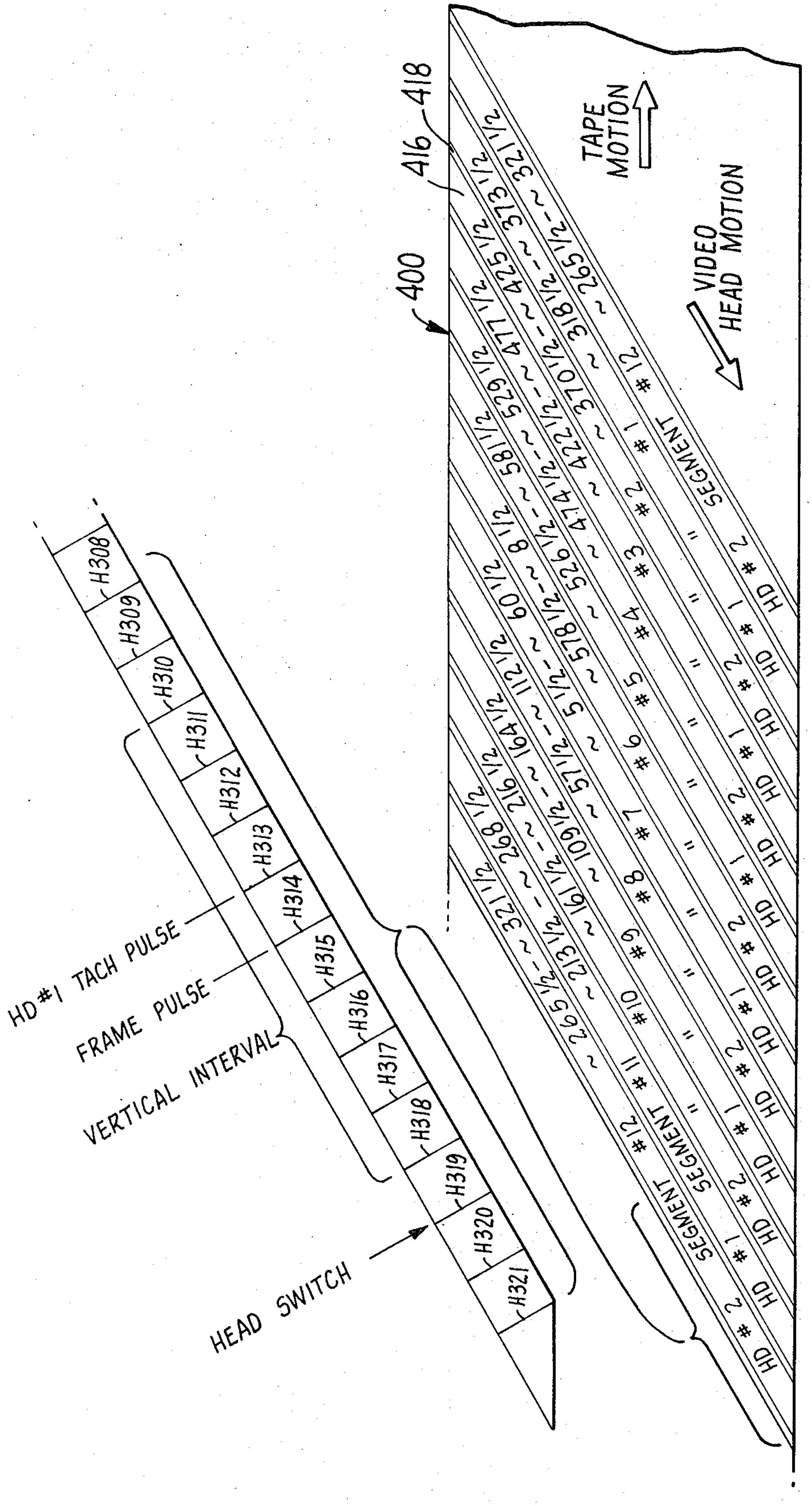
FIG. 15B is a detail of the video track portion of a recorded tape showing the details of the segmentation.

As will be better understood with reference to FIG. 15B, the head to tape contact time is constant (within the mechanical tolerances of the apparatus) and there is an overlap time when both heads are in contact with the tape due to the 180° relationship of the heads and the 188.57° wrap of the tape around the scanner. With respect to the physical relationship of the heads to the tape, the non-integral horizontal pulses can be viewed as moving with a cumulative shift of one line (1H) per monochrome frame (or H/12 per segment).

FIG. 15B is a schematic representation of the video portion 400 of the tape 28 indicating the approximate horizontal line numbers recorded on each succeeding track. Slight variations will occur due to mechanical tolerances of the apparatus. As a part of the lock up procedure in the VTR, the head 1 pulse is locked to the reference frame signal, consequently due to the head segment timing scheme, the frame pulse is recorded in the position shown on the segment 12 track. In playback, the head 1 pulse and the tape frame maintain this same relationship after the lock up of tape frame with reference frame.

Figure 16A:
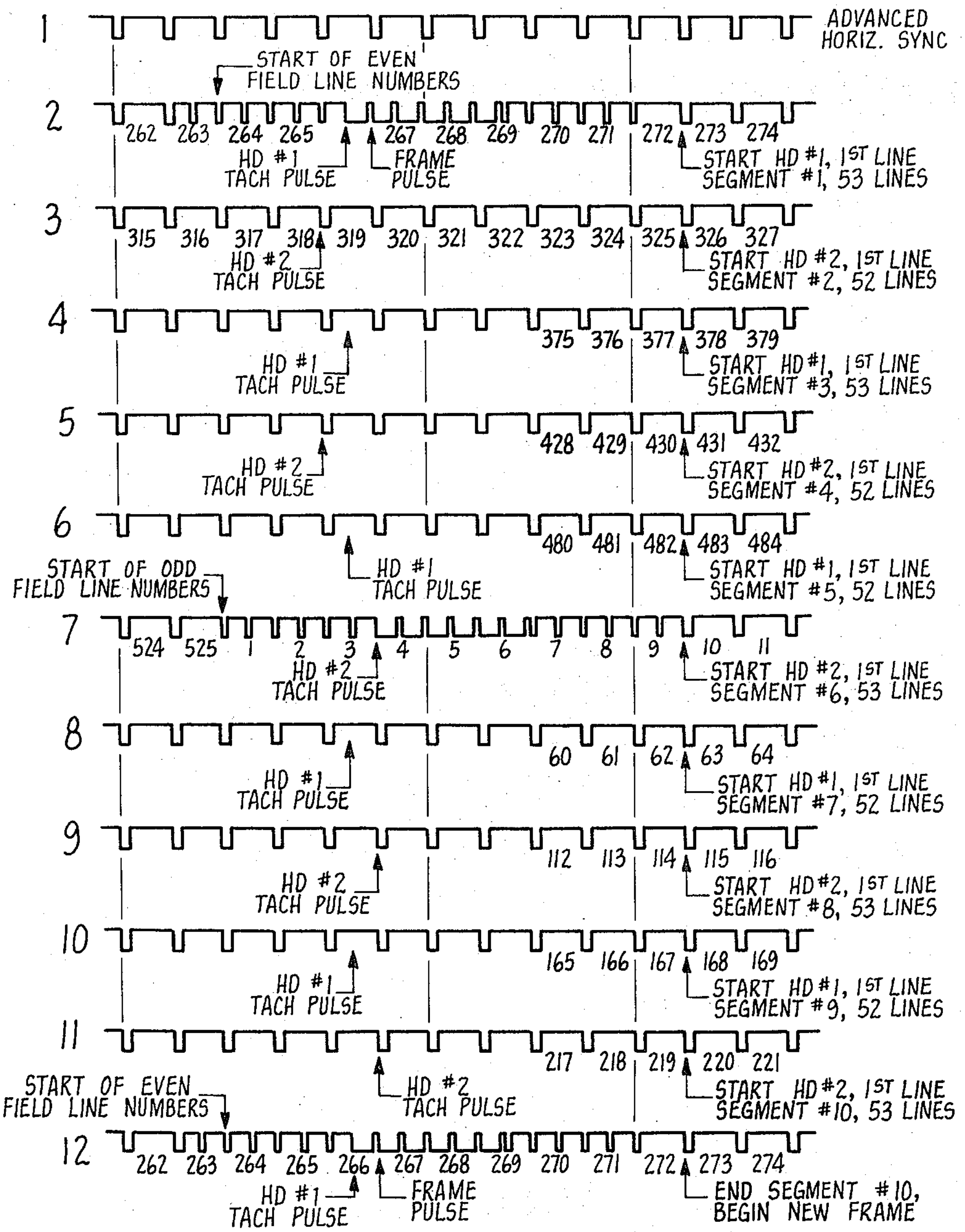
FIG. 16A is a graphical presentation of the video head switching sequence for the 60 Hertz, 525 line NTSC system version of the present invention.

FIG. 16A corresponds to FIG. 15A and shows the sequence for the 60 Hz, 525 line NTSC embodiment of the invention. The logic circuit implementing this timing chart is disclosed in FIG. 19. The head 1 tach pulse is a half line before the frame pulse, as shown in line (2). Segment 1 begins six lines after the frame pulse, as in the PAL/SECAM version. In other respects, however, the relationships of the 15,734.26 Hz horizontal rate, the 60 Hz vertical rate, the 525 lines per frame and the 150Hz/300Hz scanner tach signals cause the tach pulses to vary in a manner different from the PAL/SECAM timing chart of FIG. 15A. With respect to the NTSC horizontal pulses, the head tach pulses vary ½ horizontal line. Also, in the NTSC, version it is desirable to alternate heads on corresponding segments in order to reduce subjective color phase errors. Hence, the NTSC switching sequence is more complex than in the PAL/SECAM sequence of FIG. 15A:

| Segment | Head Active | Lines Active | Total Lines |
|---|---|---|---|
| 1 | 1 | 273–326 | 53 |
| 2 | 2 | 326–378 | 52 |
| 3 | 1 | 378–431 | 53 |
| 4 | 2 | 431–483 | 52 |
| 5 | 1 | 483–10 | 52 |
| 6 | 2 | 10–63 | 53 |
| 7 | 1 | 63–115 | 52 |
| 8 | 2 | 115–168 | 53 |
| 9 | 1 | 168–220 | 52 |
| 10 | 2 | 220–273 | 53 |

Segments 1–5 comprise one field; segments 6–10 a succeeding field.

Figure 16B:
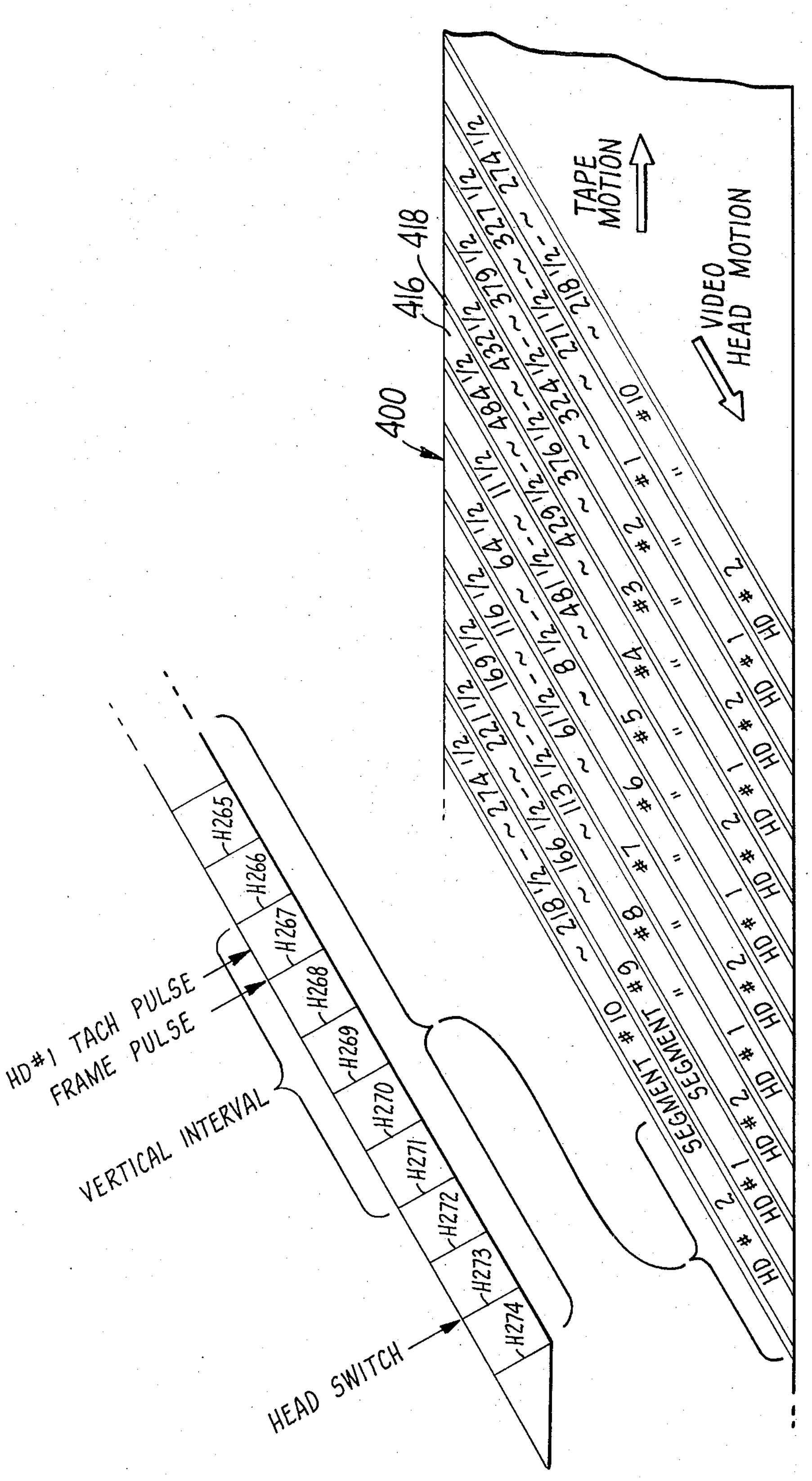
FIG. 16B is a detail of the video track portion of a recorded tape showing the details of the segmentation.

FIG. 16B corresponds to FIG. 15B and shows the approximate lines recorded on each succeeding video track 416 on the video portion 400 of the tape 28.

Figure 17A:
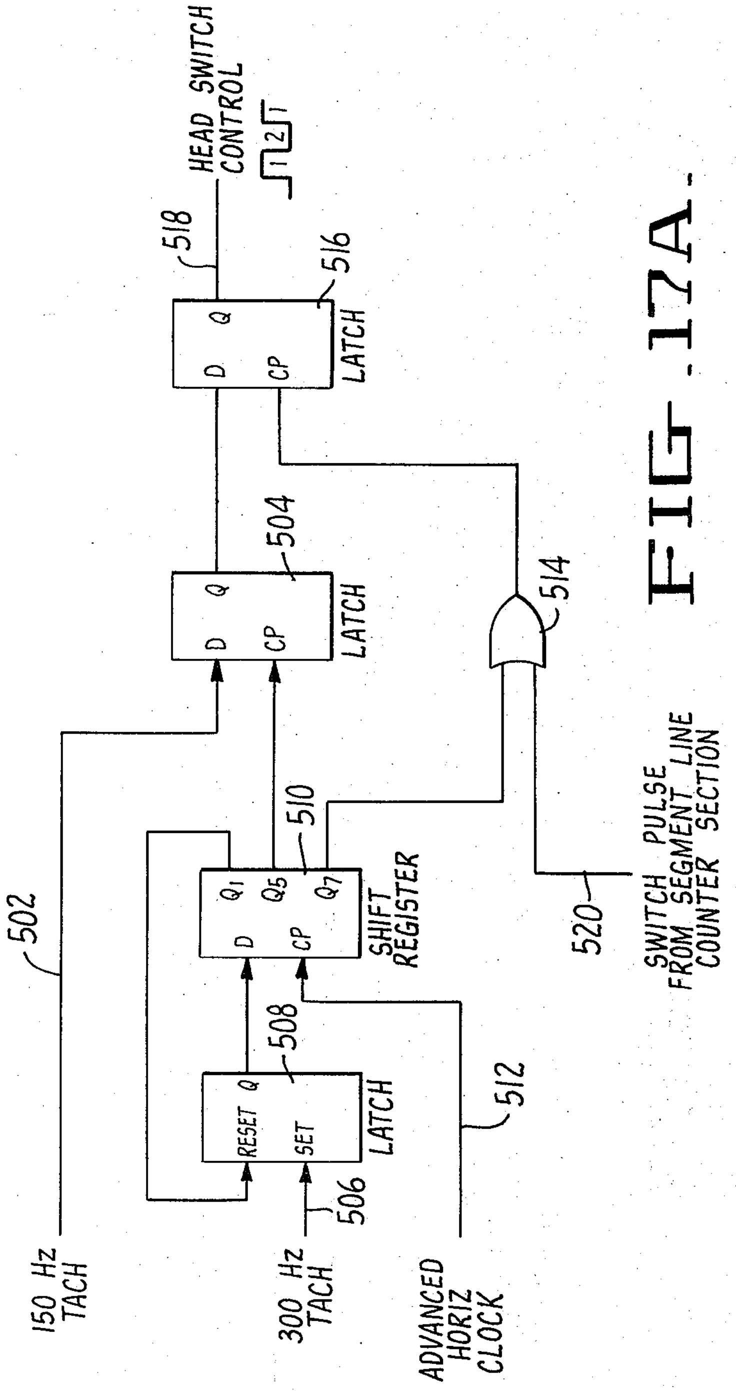
FIG. 17A is a block diagram of the logic circuit for providing tachometer controlled head switching in both NTSC and PAL/SECAM systems.
Figure 18:
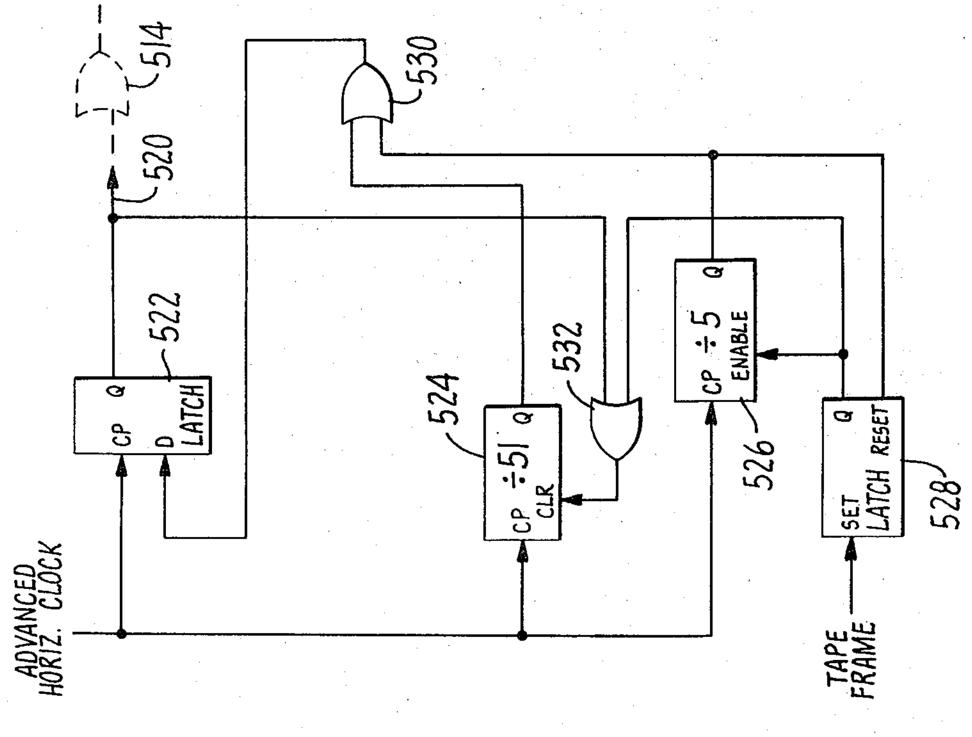
FIG. 18 is a block diagram of the PAL/SECAM logic segmenting circuit.

FIG. 17A shows in block form, the logic for providing head switching for both the NTSC (525 line) and PAL/SECAM (625 line) systems controlled by tachometer signals from the scanner disc 74 (FIG. 6). Head switching by the tachometer signals is needed when the machine is not yet locked up horizontally (i.e., the off tape horizontal is not yet phase locked to the reference (studio) horizontal). Details of the lock up sequence and servo systems associated therewith are disclosed in the copending application of Kenneth Louth, entitled Video Tape Recorder Method and Apparatus Ser. No. 285,917, filed Sept. 1, 1972 and assigned to the same assignee as this application. Prior to horizontal lock up there is no tape frame signal, hence it would be possible, absent the tachometer head switch control, to choose the wrong field as the frame. Also, once lock up is achieved, this arrangement is useful if the tape frame signal is missing.

Figures 17B, 17C:
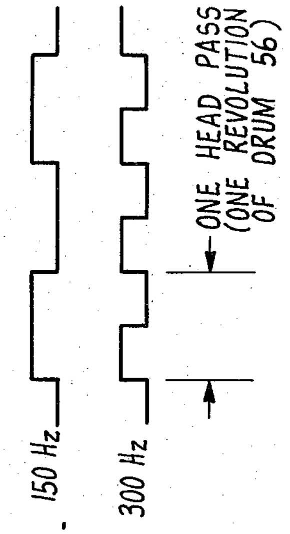
FIG. 17B is a waveform of the 150Hz scanner tachometer signal useful in understanding FIG. 17A.
FIG. 17C is a waveform of the 300Hz scanner tachometer signal useful in understanding FIG. 17A.

The 150 Hz tach signal on line 502, shown in FIG. 17B is applied to the data input of a latch 504. The 300Hz tach signal on line 506, shown in FIG. 17C is applied to the set input of a latch 508. The output Q of latch 508 is applied to the data input of a seven place shift register 510. Advanced horizontal sync pulses on line 512 are applied to the clock pulse input of register 510. The sources of the 150Hz, 300 Hz and advance horizontal sync signals are explained further below.

Figure 19:
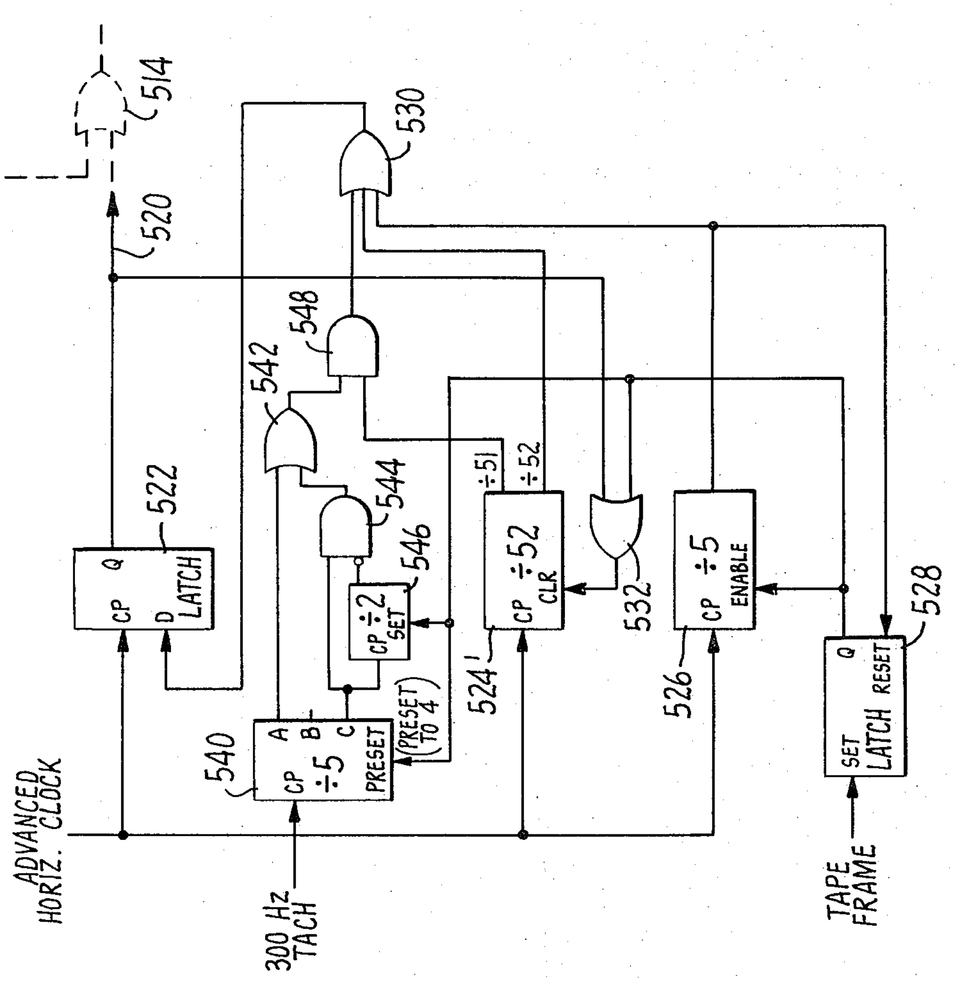
FIG. 19 is a block diagram of the NTSC logic segmenting circuit.

The "one" count Q1 output of register 510 is applied to the reset input of latch 508 and the 5 count Q5 output of register 510 is applied to the clock pulse input of latch 504. The 7 count Q7 output of register 510 is applied to one input of OR-gate 514. The other input to OR-gate 514 is on line 320 from a segment line counter logic; the logic for PAL/SECAM is shown in FIG. 18; the logic for NTSC is shown in FIG. 19. The OR-gate 514 output is to the clock pulse input of latch 516. Latch 516 receives its data input from the output of latch 504. The output Q of latch 516 provides the head switch control on line 518, high for head 1, low for head 2.

In operation, a portion of the 300Hz tach pulse is allowed into shift register 510, which resets latch 508 after 1 horizontal pulse (1H). The tach pulse is clocked through the shift register 510 by the advanced horizontal pulses. The 150Hz signal is high at every other head pass; the 300 Hz signal goes high at every head pass. Assume first that both are high. In that case, the 150Hz pulse would be present at the data input of latch 504 and would be clocked through after a delay of 5 horizontal lines (5H). Thus, after the 5H delay, latch 516 has a data input and requires only a clock pulse to provide a high output. Such a clock pulse is provided by a signal at either input of OR-gate 514. In the absence of any signal on line 520 in the interim, the 7 count Q7 of register 510 provides a signal to latch 516 which causes a high signal on line 518. When the 150 Hz signal is low, the same procedure occurs except that the output on line 518, consequently, will be low. As shown below, a high signal on line 518 selects head 1 as the playback head, a low signal head 2. Thus head switching will occur, at the latest 7 horizontal lines after the 300Hz tach signal goes positive.

As explained further below, the tach signals "drift" with respect to the horizontal pulses within each frame because of the odd number of horizontal pulses in each frame. The tachometer signals provide an indication of the physical location of the video heads 66, 68. It should be recalled that as a part of the horizontal lock up procedure, the tape frame is positioned so that head 2 reproduces it.

Referring now to FIG. 18, the block diagram of the PAL/SECAM (625 line) segment line counter is shown. This logic circuit, and the circuit of FIG. 19 for NTSC, provide a more precise head switching and this circuit accounts for the odd number of horizontal lines in PAL/SECAM by putting an extra line in the segment containing the vertical interval. The tachometer switch line is not suitable because by not putting the extra line in the vertical interval, two adjacent horizontal lines will not be reproduced from the same head once per frame. Desirably, adjacent lines are reproduced by the same head, thus reducing any "banding" effects.

Advanced horizontal clock pulses are applied to the clock pulse inputs of latch 522, divide by 51 counter 524 and divide by 5 counter 526. A signal occurring at every tape frame (the second vertical sync pulse coincides with the horizontal clock only every two fields—thus is taken as the tape frame signal) is applied to the set input of latch 528. The output Q of latch 528 is connected to the enable input of counter 526 and to one input of OR-gate 532. Counter 526's output is applied to the reset input of latch 528 and to an input of OR-gate 530.

The output of OR-gate 532 is applied to the clear input of counter 524. The counter 524 output is applied to the other input of OR-gate 530, which has its output applied to the data input of latch 522. Latch 522 provides the output on line 520 to OR-gate 514 of FIG. 17. The output is also applied to the other input of OR-gate 532.

In operation, the tape frame signal sets latch 528, enabling ÷5 counter 526 and clearing ÷51 counter 524. Five horizontal (5H) pulses after the tape frame ÷5 counter 526 provides a signal to OR-gate 530 and hence to the data nput of latch 522, meanwhile ÷51 counter 524 is held clear. Latch 522 adds one horizontal count and also makes the output synchronous with the horizontal pulses. Divide by five counter 526 and divide by 51 counter 524 are non-synchronous; the latch 522 is used to make the line 520 output synchronous. Thus at six horizontal pulses past tape frame head switching is achieved if the 5 horizontal line delayed 150Hz tach signal is present (FIG. 17). This head switch ends segment 12, which, as shown on FIG. 15, ends six horizontal lines after the frame pulse and has 53 horizontal lines.

When ÷5 counter 526 reached its five count, it resets latch 528, thus removing the clear signal from ÷51 counter 524. Counter 524, however, was cleared by the output on line 520. On the next horizontal pulse following the output on line 520, ÷51 counter begins counting and provides an output to OR-gate 530 and the data input of latch 522 which adds one count and provides a synchronous output on line 520 after 52 horizontal lines thus defining segment one. The sequence repeats itself through the segments 1 through 11 that are each 52 lines long. The 12th segment is 53 lines long by operation of the tape frame and ÷5 counter 526 as described above.

The switching sequence for the 525 line NTSC system is somewhat more complex. Logic for accomplishing the NTSC switching is shown in FIG. 19. The circuit is in some respects identical to FIG. 18 and the same reference numerals are carried through on corresponding elements. The description of the identical portions will not be repeated.

A ÷52 counter 524' is provided having ÷51 and ÷52 outputs. It is desired to provide 52 line segments for segments 2,4,5,7, and 9, whereas for the remaining segments 53 lines are desired. The ÷5 counter 526 activated by the frame pulse provides a 53 line last segment (segment 10 in NTSC) as in the PAL/SECAM circuit. In order to provide the 52 line segments at the appropriate times, a counter, decoder and gating arrangement is provided to pass the ÷51 output from counter 524' at the proper times.

The 300 Hz tach signal is applied to the clock pulse input of a divide by 5 counter 540. Counter 540 has binary output lines A($2^0$), B($2^1$), C($2^2$). The A line is connected to an OR-gate 542. The B line is not connected; the C line is connected to one input of an AND-gate 544 and to the clock pulse input of a divide by 2 counter 546. The output of counter 546 is applied to a not input of AND-gate 544. The gate 544 output is applied to gate 542, the output of which is, in turn, applied to an AND-gate 548. The other input to gate 548 is from the ÷51 output of counter 524'. The latch 528 output is further applied to the preset input of counter 540, which presets the counter to a count of four, and to the set input of counter 546.

Generally stated, the additional logic elements provide an input to AND-gate 548 at segments 2, 4, 5, 7 and 9 to permit the ÷51 output from counter 524' to reach OR-gate 530 and latch 522 which adds one count, making it 52 lines as desired, and makes the output synchronous. The output on line 520 clears counter 524' so that the counter sequence count may be repeated.

Figure 20A:
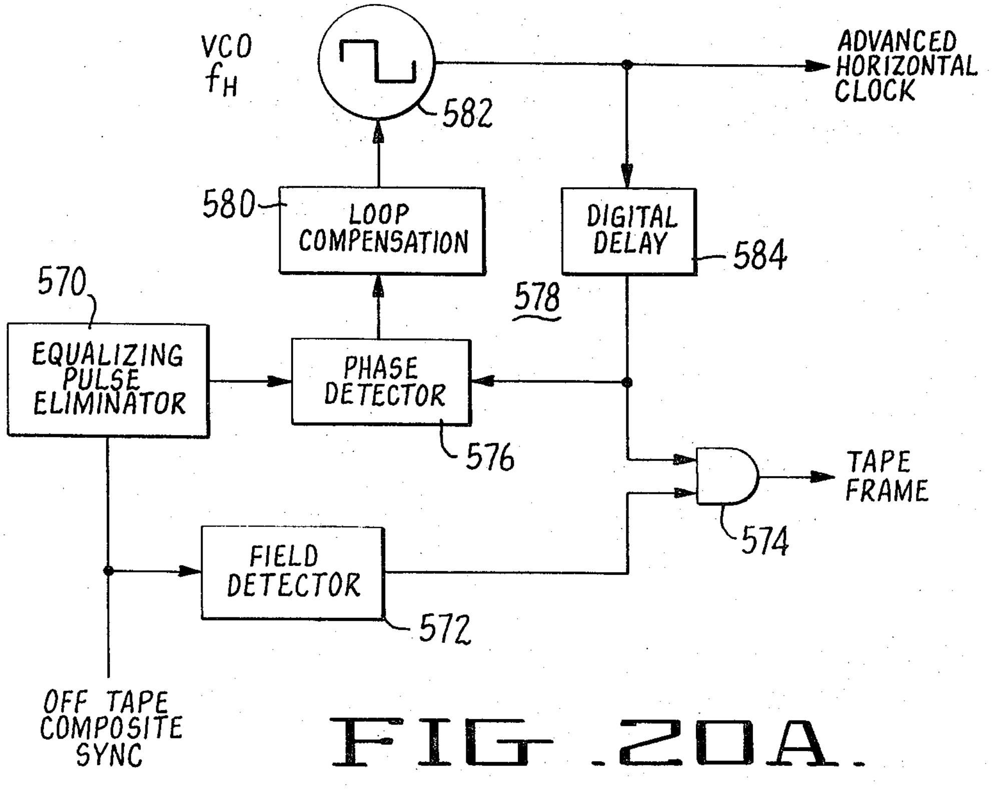
FIG. 20A is a block diagram of a circuit for providing advanced off-tape horizontal clock pulses and tape frame pulses.
Figures 20B, 20C:
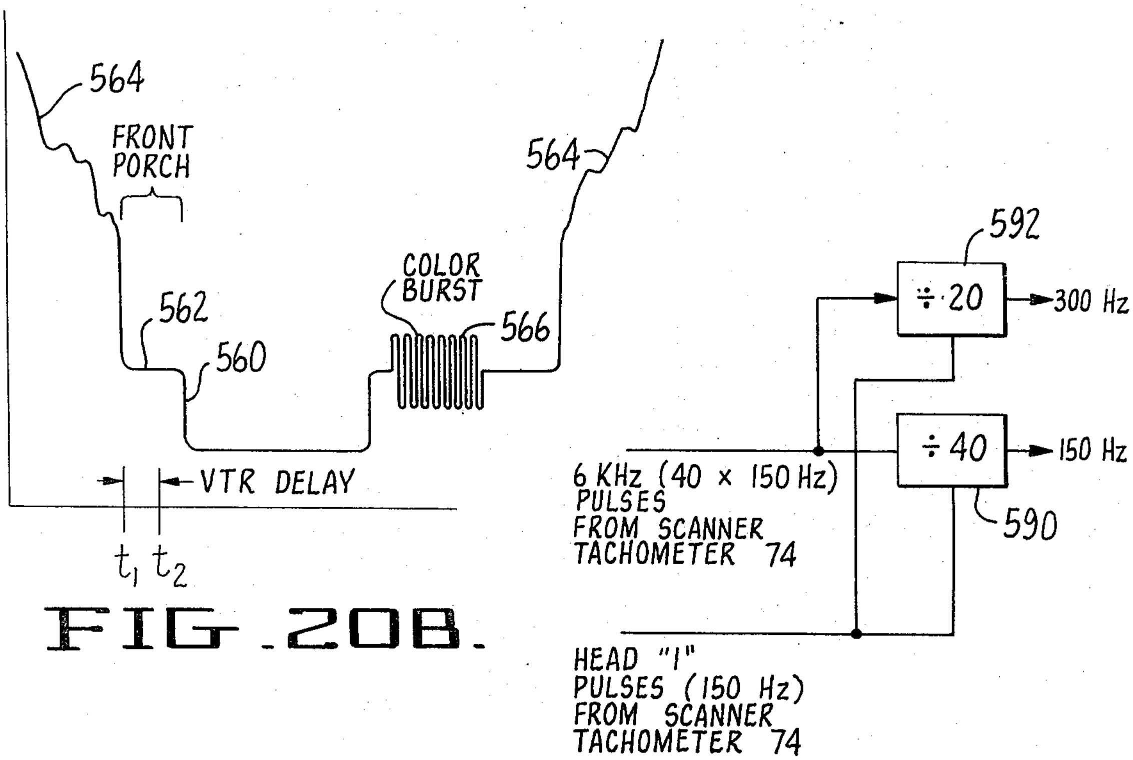
FIG. 20B is a portion of a composite television waveform centered around a horizontal sync pulse showing the desired head switching time.
FIG. 20C is a block diagram showing the sources of the 300 Hertz and 150 Hertz signals used in the circuits of FIGS. 17, 18 and 19.

FIG. 20A shows in block diagrammatical form the circuitry for providing the advanced horizontal clock pulses and the tape frame pulses. In FIG. 20B a portion of a television waveform centered around a horizontal sync pulse 560 is shown. The so-called front porch 562 follows the video information 564 and precedes the horizontal sync pulse 560. The desired time for accomplishing a head switch is in the middle of the "front porch" 562 on that neither the video 564, sync pulse 560, nor color burst 566 is interrupted. Interruption of the sync pulse, for example, could affect the stability of the played back video signal. Due to the inherent delay in the handling of the video signal in the VTR, which is the cumulative effect of input filtering, modulation and demodulation, etc., etc. it is necessary to "advance" the off-tape horizontal sync signals so that the head switch occurs in the middle of the front porch at time $t_2$. Due to the VTR time delay the switching would occur at about time $t_1$, thus the horizontal sync pulses must be "advanced" by the $(t_2-t_1)$ delay time.

Referring to FIG. 20A, off tape composite sync is applied to an equalizing pulse eliminator 570, which may take the form of a one-shot having a period greater than ½H and less than H so as to ignore the serrations in the equalizing pulses, and to a field detector 572, which provides an output to AND-gate 574 at the start of the second broad pulse of every vertical interval. The horizontal pulse output from block 570 is applied to one input of a phase detector 576 that forms a part of a phase locked loop 578. Loop 578 includes a conventional loop compensation filter 580 receiving the detector 576 output. Filter 580 is connected to a voltage controlled oscillator (VCO) 582 operating at a nominal frequency of $f_H$, the horizontal sync frequency. VCO 582 provides the advanced horizontal output because the loop includes a digital delay 584 between the VCO 582 and the other input to phase detector 576. Delay 584 provides a delay of 2.5 $\mu$ seconds, a time required to overcome the $(t_2-t_1)$ delay present in one particular working embodiment of the invention. The time may be varied in accordance with the requirements of a particular machine. Since the output from delay 584 to the phase detector is delayed, the loop output is therefore advanced by the delay time.

Because the timing of the tape frame pulse need not be as precise as the horizontal clock to the head switching circuits of FIGS. 17, 18 and 19, the tape frame signals may be derived by AND-gate 574 that provides a tape frame signal only when the tape field signal coincides with a horizontal pulse, which occurs only every other field.

FIG. 20C shows the sources of the 300Hz and 150Hz signals for use in the head switching circuits of FIGS. 17, 18 and 19. When the scanner is run at a 150Hz rotation rate, then the pulses from the scanner tachometer are at a 6KHz rate (40 slots × 150Hz). The 6KHz tach signal is applied to a divide by 40 counter 590 and to a divide by 20 counter 592. The head 1 pulses (at 150Hz) from scanner tachometer disc 74 are applied to counters 590 and 592 in order to synchronize the counters. Thus counter 590 provides a 150Hz square wave signal synchronized with head 1 and 590 provides a 300Hz square wave signal synchronized with head 1.

Figure 21A:
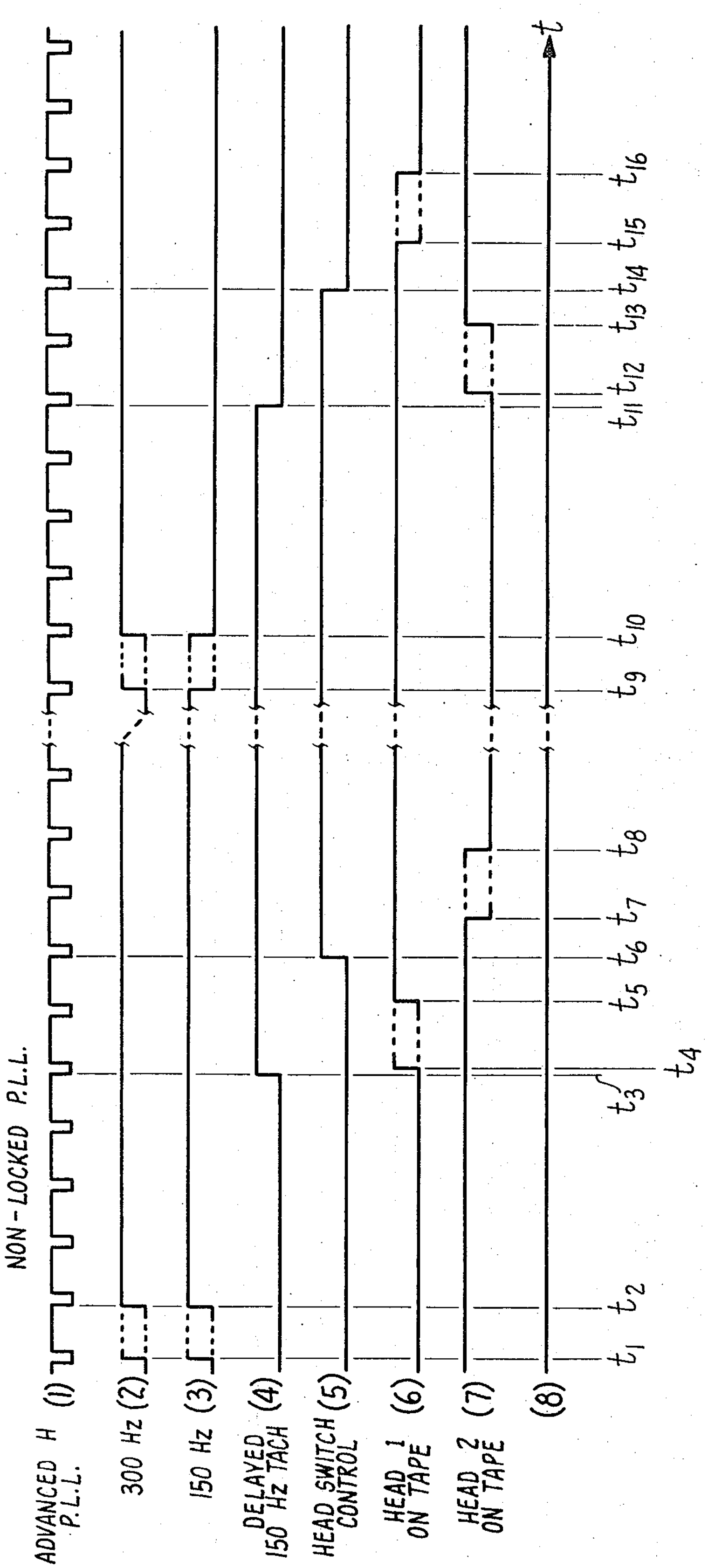
FIGS. 21A – 21C show various timing waveforms related to the video head switching sequences and the operation of the circuits of FIGS. 17 and 18.
Figure 21B:
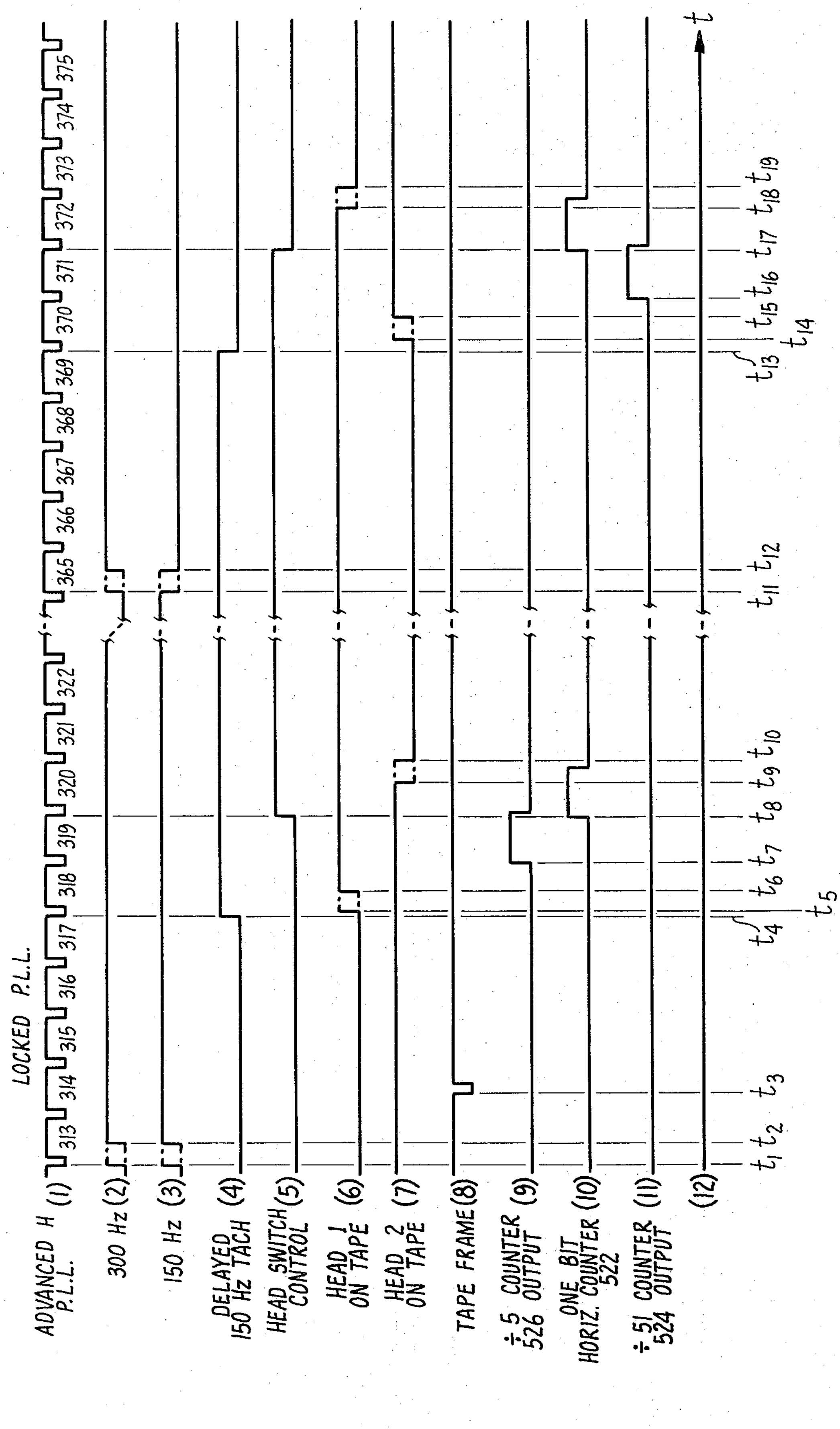
Figure 21C:
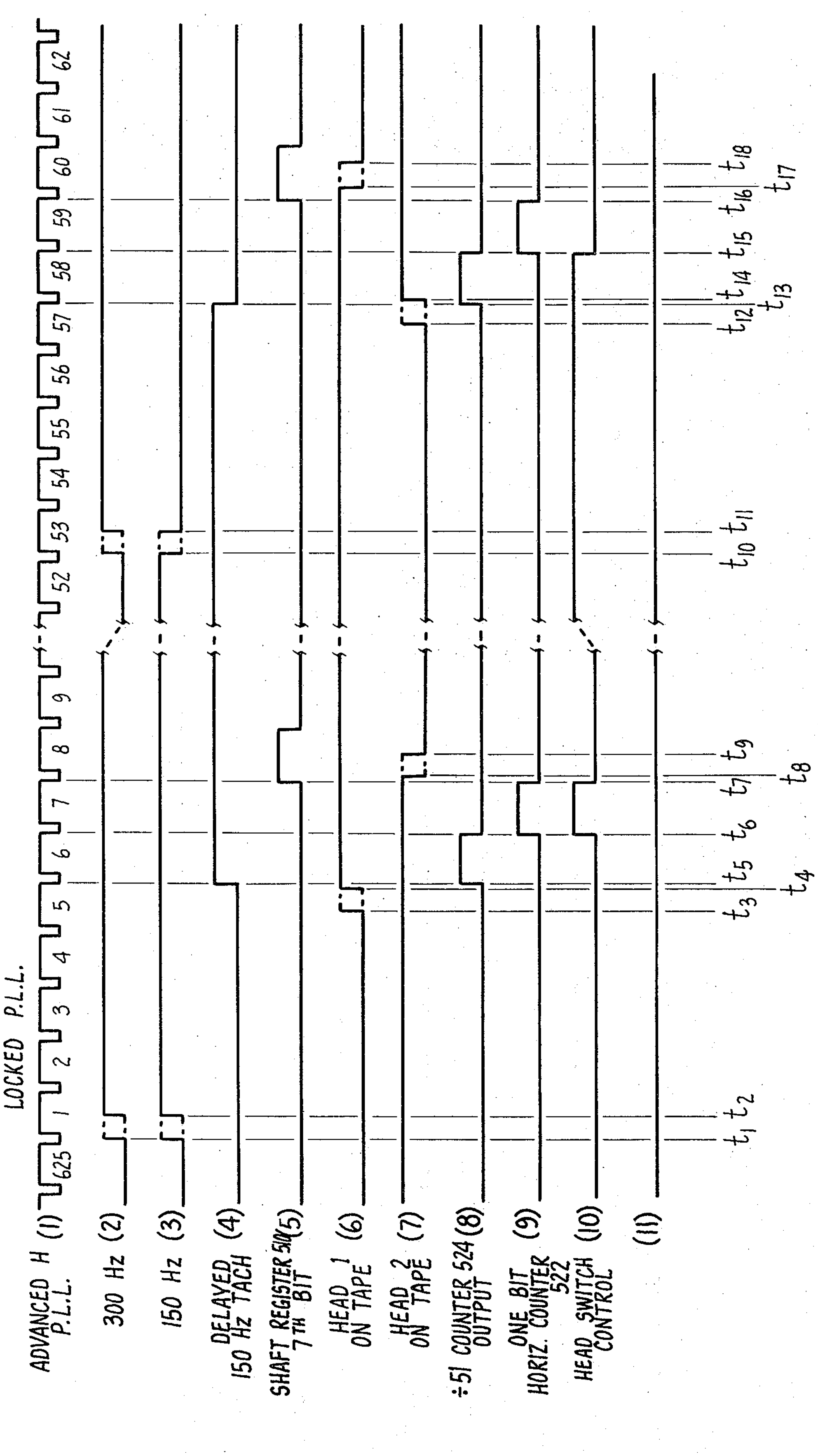

FIGS. 21A – 21C show various timing waveforms useful in gaining a better understanding of the head switching sequences and the operation of the circuits of FIGS. 17 and 18.

In FIG. 21A waveforms for the condition where the VTR tape signals are not phase locked to the reference signals are shown. The circuit of FIG. 17 thus provides the head switch control. This applies both to NTSC and PAL/SECAM versions. In line (1) the advanced horizontal pulses are shown. Lines (2) and (3) show the 300Hz and 150Hz tack signals going positive somewhere between $t_1$ and $t_2$: since the VTR is not in its locked mode, the timing relationship between the tach signals and the advance horizontal is not defined. The circuit of FIG. 17 delays the 150Hz tach signal by 5H to $t_3$ (line 4) and provides the head switch control 2H later at $t_6$ (line 5). Physically, head 1 is first on the tape somewhere between $t_4$ and $t_5$, prior to the time $(t_6)$ that the head switch control makes head 1 active. Head 2 leaves the tape between $t_7$ and $t_8$. The time ranges $t_4$ – $t_5$ and $t_7$ – $t_8$ for starting and ending head/tape contact are due to mechanical tolerances. When the 150Hz tach goes negative and the 300Hz tach goes positive again at $t_9$ – $t_{10}$ the 5H delay of the 150Hz tach occurs at $t_{11}$ and 2H later at $t_{14}$ the head switch occurs making head 2 active. Head 2 first touches the tape between $t_{12}$ and $t_{13}$ and head 1 leaves the tape between $t_{15}$ and $t_{16}$.

FIGS. 21B and 21C show timing waveforms occurring in connection with the head switching controlled by FIGS. 17 and 18 for the 625 line PAL/SECAM system when the VTR tape signals are in phase lock with the reference signals.

In FIG. 21B, the head switch at $t_8$ occurs by the joint operation of the FIG. 17 and FIG. 18 logic. That is, the delayed 150Hz tach (line 4) plus 2H causes the head switch at $t_8$(horizontal line 319). Also, the tape frame signal at $t_3$ results in an output from divide by 5 counter 526 at $t_7$ which is delayed one bit by latch (counter) 522 to provide the head switch control at $t_8$. Thus for the beginning of segment 1 at horizontal line 319, the tach switch and scheduled switch are simultaneous. It will be seen that this is not always the case, otherwise, as mentioned above, only the tach switch logic would be required. The next consecutive head switch at $t_{17}$ again occurs at the same time whether controlled by the tach logic of FIG. 17 or the logic of FIG. 18. In this case, the divide by 51 counter 524 plus the one bit delay by latch 522 causes the switch at the same time as the delayed 150Hz tach signal.

In FIG. 21C the FIG. 18 logic provides a head switch earlier than the tach signal switch signal of FIG. 17. Thus, the tach switch would occur at $t_7$ in the absence of a signal from one bit counter (latch) 522 at $t_6$. At the next succeeding switch, the one bit counter (latch) 522 provides a switch at $t_{15}$, earlier than the tach switch at $t_{16}$.

Figure 22A:
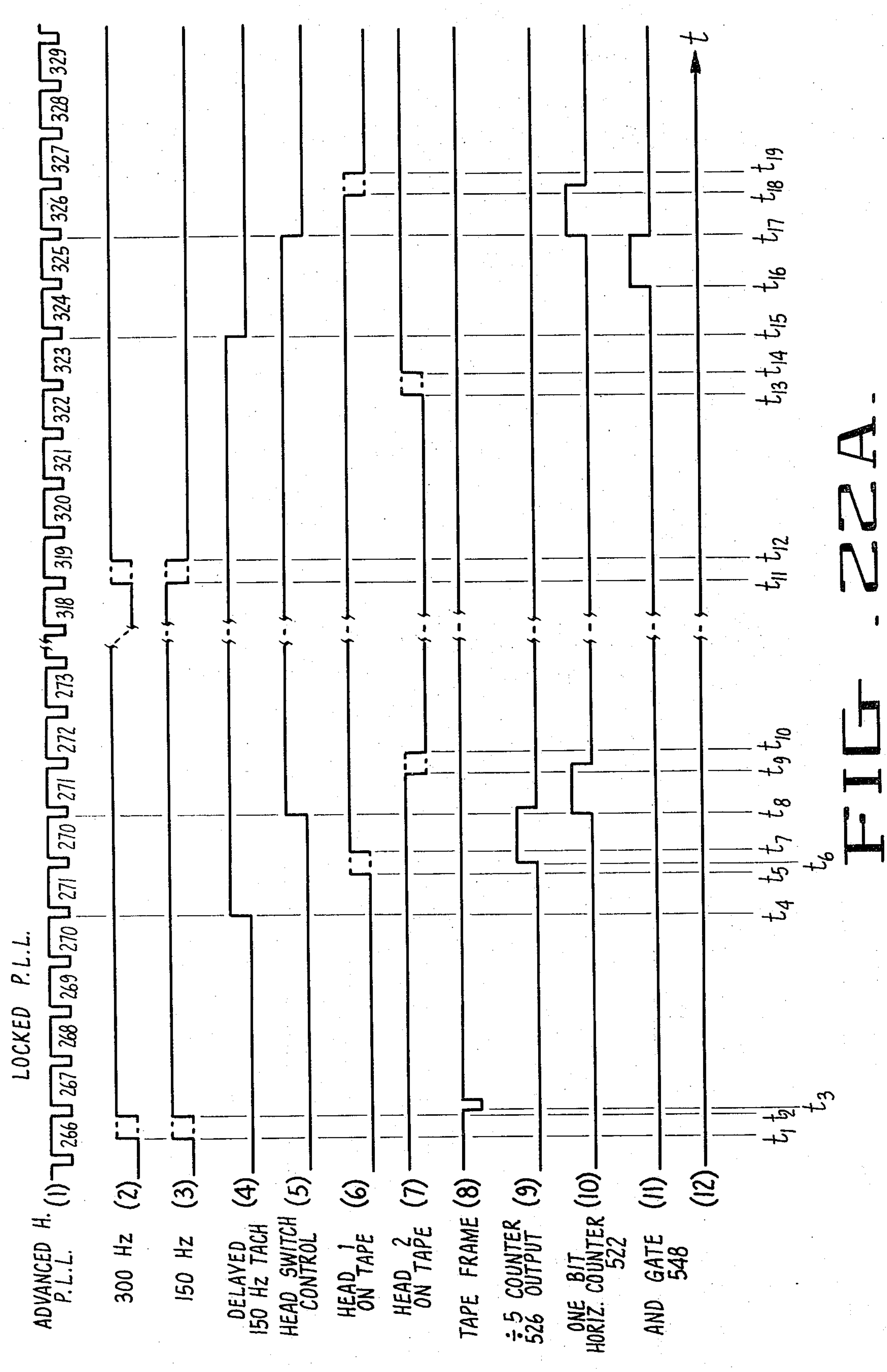
FIGS. 22A and 22B show various timing waveforms related to the video head switching sequences and the operation of the circuits of FIGS. 17 and 19.
Figure 22B:
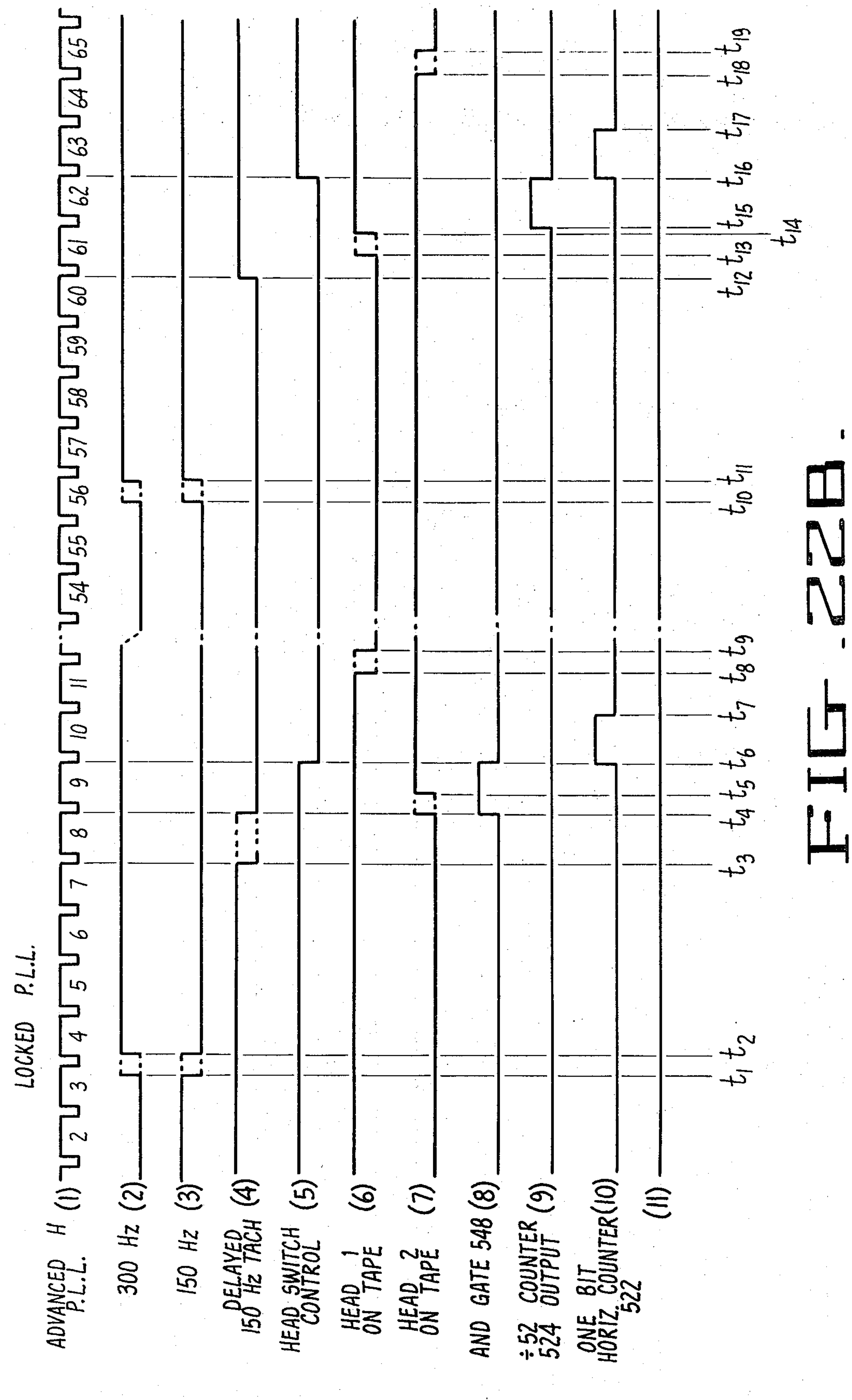

FIGS. 22A and 22B show timing waveforms for a phase locked NTSC VTR associated with the logic circuits FIGS. 17 and 19.

In FIG. 22A, the first head switch occurs at $t_8$ resulting from the delayed 150Hz tach plus 2H and from the one bit counter (latch 522). The next consecutive head switch occurs at $t_{17}$, resulting from both the tach signals and from the one bit delayed output from the AND-gate 548.

In FIG. 22B, the first head switch at $t_6$ occurs earlier than the tack switch would occur as a result of the one bit delayed AND-gate 548 signal. The next consecutive head switch occurs at $t_{16}$ as a result of the tach signals and the one bit delayed output of counter 524'.

Figure 23:
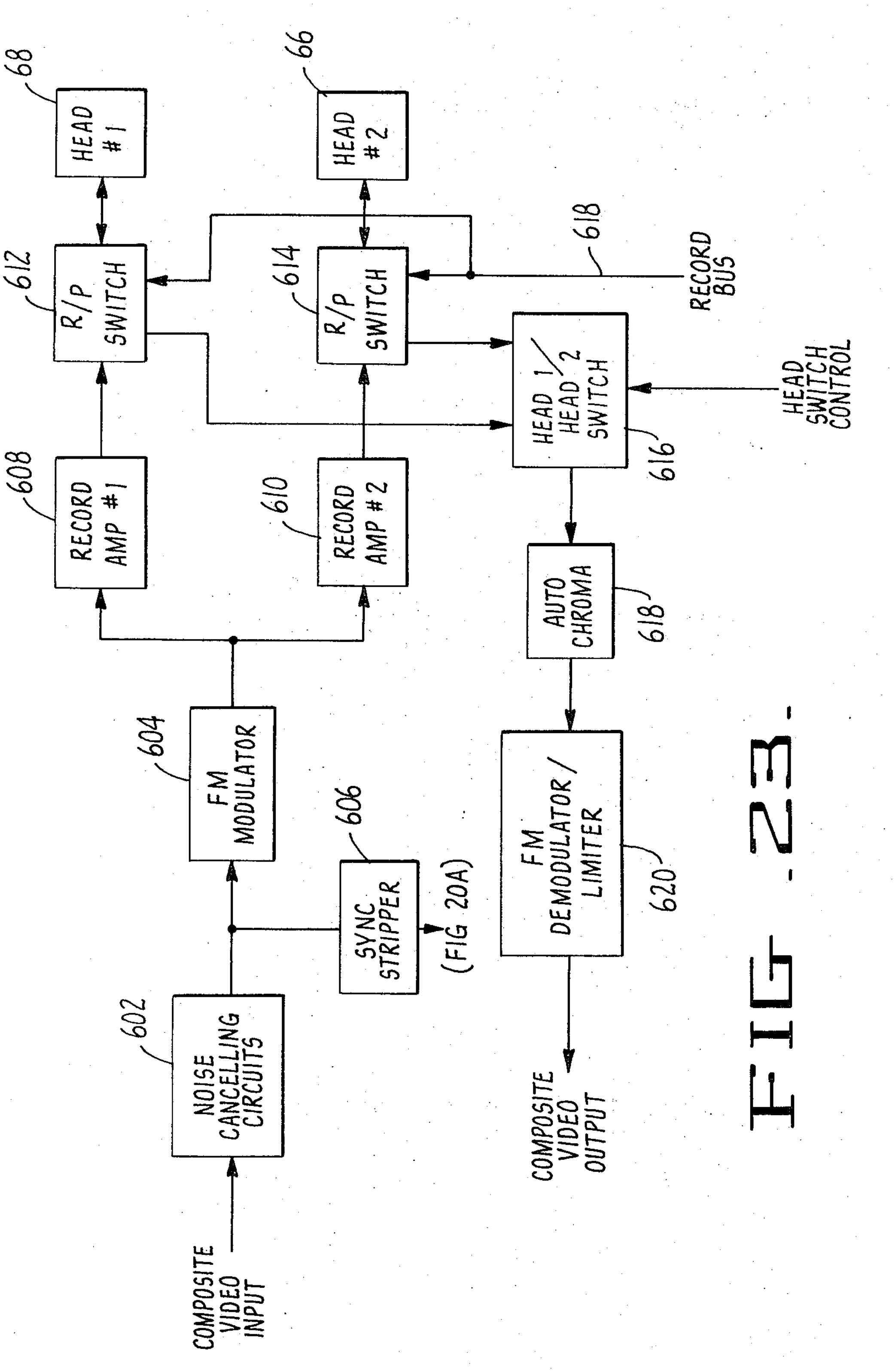
FIG. 23 shows a simplified block diagram of a VTR signal system employing the present invention.

A simplified block diagram of the signal system of a VTR embodying the present invention is shown in FIG. 23. A composite video input signal is applied to conventional noise cancelling circuits 602 that prepare the signal for an FM modulator 604. In the 625 line/50Hz PAL/SECAM version, the 0–6MHz baseband signal modulates a double-sideband FM carrier having a deviation from about 9 to 12MHz. A sync stripper 606 provides horizontal and vertical sync pulses to the circuit of FIG. 20A.

A demodulator particularly adapted for use in this environment is disclosed in the copending application of Bert H. Dann entitled FM PULSE AVERAGING DEMODULATOR, Ser. No. 285,924 filed Sept. 1, 1972, now U.S. Pat. No. 3,783,398 and assigned to the same assignee as this application.

The modulator 604 output is simultaneously applied to a record amplifier No. 1 (608) and a record amplifier No. 2 (610). First and second record/playback switches 612 and 614 either connect head No. 1 (68) to the record amp 608 or to the head 1/head 2 switch 616 and either connect head No. 2 (66) to record amp 610 or to the switch 616. Record bus line 618 controls switches 612 and 614. Switch 616 is under the control of the head switch logic of FIGS. 17–19. The output of switch 616 is applied to an auto chroma circuit 618 which matches the playback characteristics of head 2 against head 1, which is the standard. The signal is then applied to an FM demodulator and limiter cicuit 620 that provides a composite video output signal.

In the record mode it will be noted that the RF signal from modulator 604 is continuously applied to both heads and that there is no head switching during the record mode.

Figure 24:
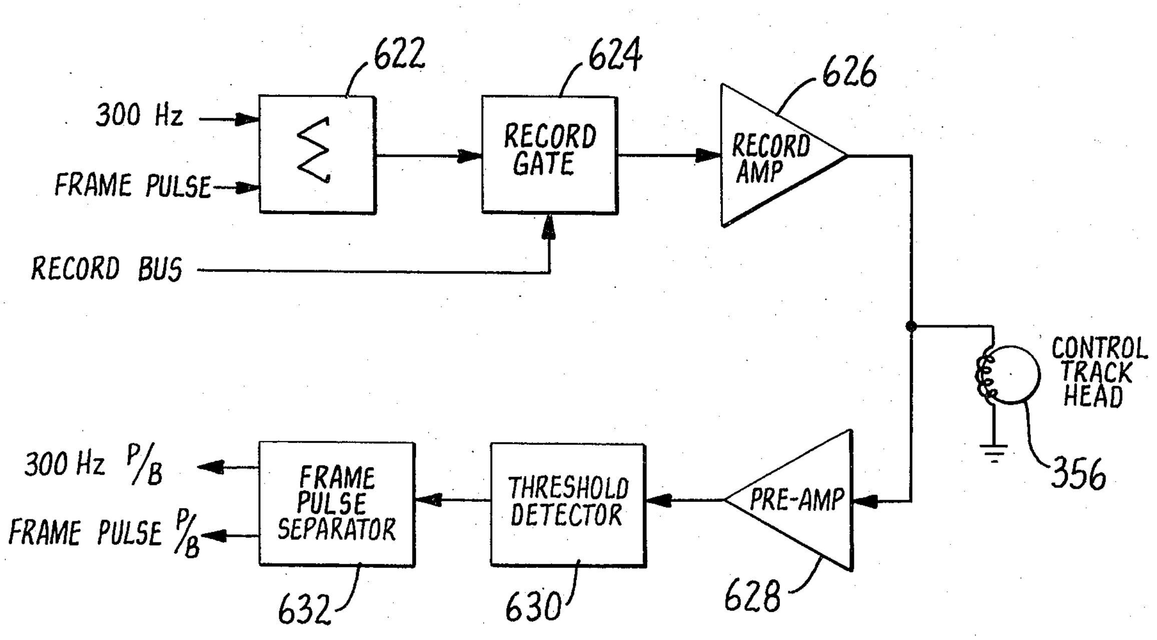
FIG. 24 is a block diagram of the control track and playback circuitry.

Referring now to FIG. 24 a block diagram of the control track record and playback circuitry is shown. A summing circuit 622 receives the 300Hz tach signal (FIG. 20C) and the frame pulse signals (FIG. 20A), combines them and applies them to a record gate 624 controlled by the record bus line. When gated on, gate 624 applies the tach and frame signals to a record amp 626 which is connected to the control track head 356. The signals are saturation recorded by head 358 onto the tape. For playback, the control track head 356 is connected to a preamplifier 628 which drives a threshold detector 630. When the signal exceeds a threshold level, indicating the presence of a control track signal, the detector applies the signal to a frame pulse indicator 632 which provides the 300Hz tach signals and frame pulses on separate lines.

Figure 25:
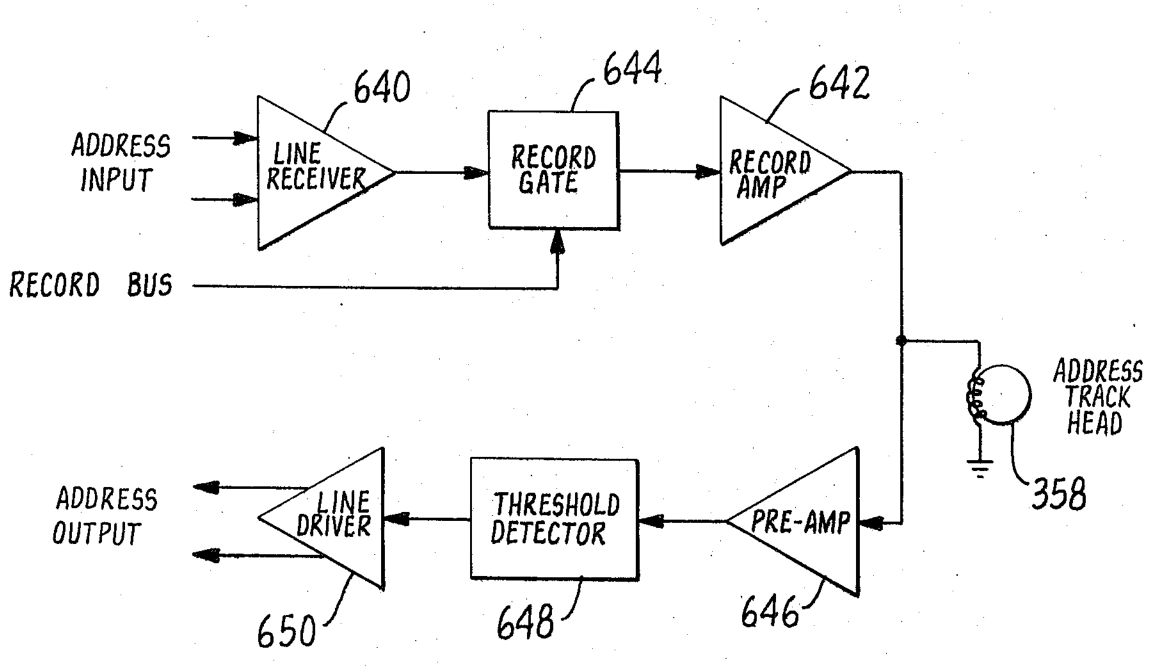
FIG. 25 is a block diagram of the address track record and playback circuitry.

FIG. 25 shows a block diagram of the address track record and playback circuitry. The address code is in binary digital form according to the SMPTE standard and is applied to a line receiver 640 whose output is applied to a record amplifier 642 when record gate 644 is activated by the record bus. The data is applied to address track head 358 for saturation recording on the tape. In playback, the signals are applied to pre-amp 646, threshold detector 648 and a line driven 650 which provides the data output.

Figure 26:
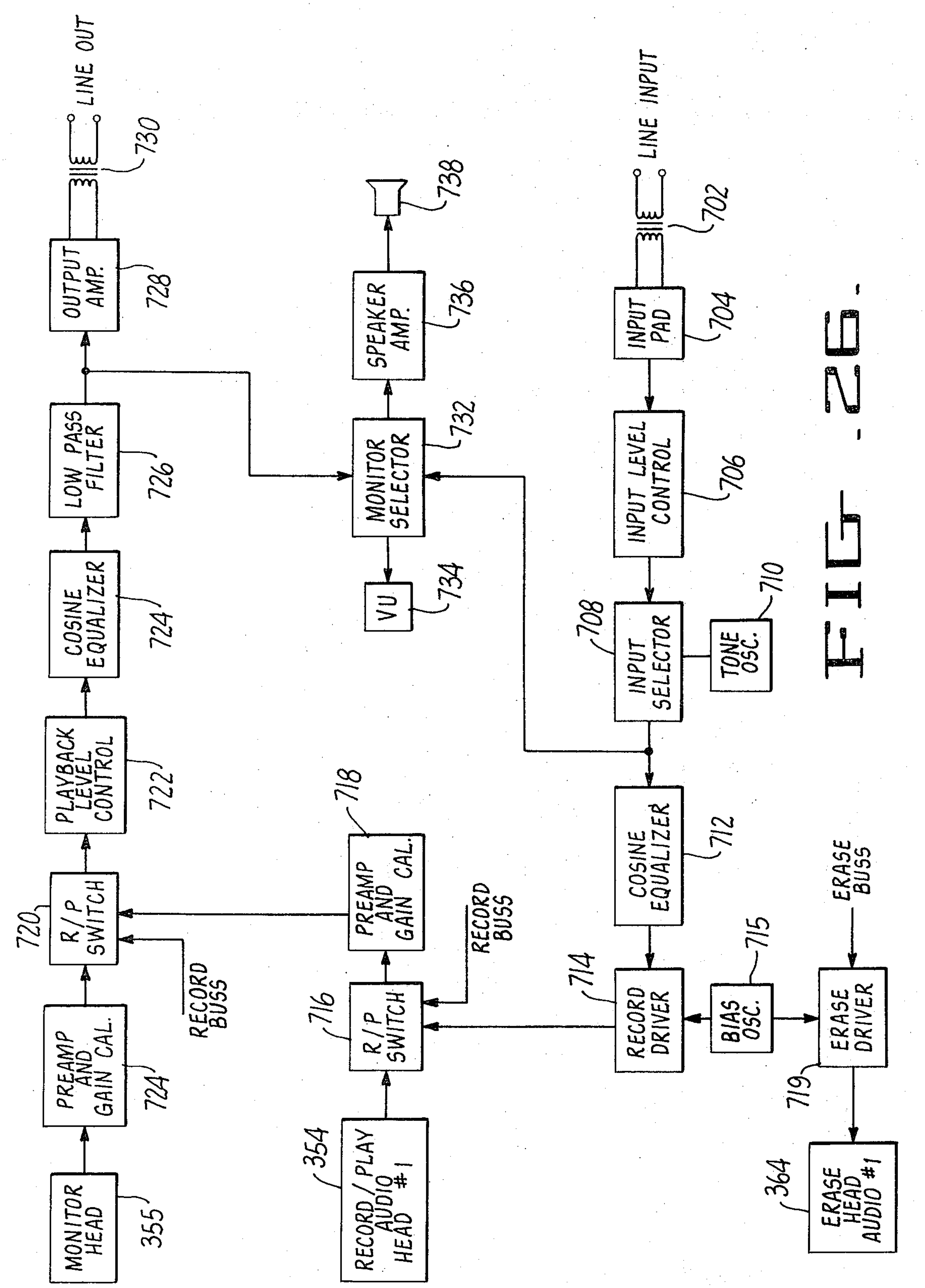
FIG. 26 is a block diagram of the audio (1 or 2) record and playback circuitry.

FIG. 26 shows a block diagram of a record/playback system for use with the audio track No. 1, audio track No. 2, or (with modifications noted below) the cue track.

The audio input, typically on a 600 ohm line, in applied through a matching transformer 702, and an input pad 704 to the input level control 706. A selector 708 may be manually adjusted to apply either the audio input from the line or a test tone from tone oscillator 710. The output of selector 708 is processed by a cosine equalizer 712 and applied to a record driver for driving the record/play head 354. A conventional bias oscillator 715 is used both by the record driver 714 and an erase driver 719 that drives the erase head 364 when instructed by the erase bus.

Cosine equalizer 712 (a corresponding one is used in the playback circuit) provides linear phase connection which allows clearer reproduction after multiple dubbings. Cosine equalizers are also known as aperture correctors in the art.

A record bus line controls record playback switch 716 so as to connect the record driver to the head during record and to a preamp 718 with gain calibration during playback. The preamp 718 output is applied to a further record/playback switch 720 which under the control of the record bus applies the preamp 718 output to playback level control 722 during playback and applies the preamp and gain calibration block 724 output during record. Thus, in record the playback system receives the monitor head 355 output.

A further cosine equalizer 724 receives the block 722 output and applies the processed signal to a low pass filter 726 having an upper frequency cut off slightly above the highest audio frequency of interest. The filter 726 output is applied to an output amplifier 728 which drives the line output transformer 730.

A monitor selector 732 which drives a VU (record level) meter 734 selects either the tape signal from filter 726 or an input signal from selector 708 for application to a speaker amplifier 736 and speaker 738.

The same circuitry is applicable to the audio No. 2 channel.

For the cue channel, the cosine equalizers are omitted and a microphone is provided at the record input (to pad 704).

I claim:

1. Apparatus for recording a television signal having a plurality of fields each including a plurality of horizontal lines as a plurality of tracks on a width of magnetic tape comprising:

means receiving said television signal for providing a carrier signal having an instantaneous frequency deviating from about 9 to 12 MHz modulated in accordance with said television signal, helical scanner assembly means including a rotating member carrying at least two video recording heads, means for applying said modulated carrier signal to said recording heads, means for transporting said magnetic tape past said scanner assembly means in an omega wrap configuration and, means for controlling said helical scanner assembly means and said transporting means to record said plurality of tracks on said width of magnetic tape, each of said tracks carrying substantially a predetermined fraction of horizontal lines of a complete video field.

2. Apparatus according to claim 1 wherein said rotating member carries two video recording heads spaced substantially 180° apart on said rotating member.

3. Apparatus according to claim 2 wherein the width of tape occupied by the television signals is less than the full physical width of the tape and further comprising means for longitudinally recording information of said magnetic tape along the portion of the tape not occupied by the television signal tracks.

4. Apparatus according to claim 3 wherein said means for longitudinally recording information comprises means for recording at least one audio channel and one control track channel.

5. Apparatus according to claim 3 wherein said means for longitudinally recording information comprises means for recording two wide response audio channels, one narrow response audio cue channel, one control track channel and one address code channel.

6. Apparatus according to claim 2 wherein said means for transporting said magnetic tape past said scanner assembly means includes means for transporting said magnetic tape at a longitudinal speed of about 8 inches per second.

7. Apparatus according to claim 2 wherein said means for controlling includes means for providing a relative speed between said video recording heads and said magnetic tape of about 1,500 inches per second.

8. Apparatus according to claim 2 wherein said helical scanner assembly means includes means for rotating said rotating member at a rotational rate of about 9,000 revolutions per minute.

9. The combination of claim 2 wherein the apparatus is also for playing back a recorded video signal in a playback operation mode, said video recording heads functioning to play back recorded video signals, the combination further comprising means connected to said video heads in said playback mode for switching between said heads in a predetermined sequence to provide a reconstructed carrier signal, and means for demodulating said reconstructed carrier signal to provide a television signal substantially in accordance with said recorded television signal.

10. The combination of claim 9 further comprising means for adjusting the chroma burst amplitude of the video signal from one head to match the chroma burst level from the other head.

11. The combination of claim 9 wherein the predetermined sequence for switching between the heads provides that adjacent horizontal lines in a played back NTSC television signal are derived from alternate heads.

12. The combination of claim 9 wherein the predetermined sequence for switching between heads provides that adjacent horizontal lines in a played back PAL or SECAM television signal are not derived from alternate heads.

13. The combination of claim 9 further comprising an erase head carried by said rotating member and dimensioned to erase two video tracks per pass.

14. The combination of claim 9 wherein an NTSC signal is recorded and wherein said predetermined fraction of horizontal lines is about one fifth of the horizontal lines for each video field and wherein said switching means includes means for dividing each video frame into consecutive segments of 53, 52, 53, 52, 52, 53, 52, 53, 52 and 53 horizontal lines.

15. The combination of claim 9 wherein a PAL or SECAM signal is recorded and wherein said predetermined fraction of horizontal lines is about one sixth of the horizontal lines for each video field and wherein said switching means includes means for dividing each video frame into 11 consecutive segments of 52 horizontal lines followed by one segment of 53 horizontal lines.

16. A process for recording information onto a magnetic tape longitudinally transported in an omega wrap configuration around a helical scanner assembly comprising modulating a carrier signal having an instantaneous frequency deviation from about 9 to 12 MHz with a television signal, recording the modulated carrier signal onto a series of substantially parallel tracks forming an angle of about 19.55° to the edge of the tape, said tracks each having a length of about 5.24 inches and lying within less than the full tape latitudinal width, and recording a plurality of tracks parallel to the edge of the tape in the area not occupied by said modulated carrier signal tracks.

17. The process of claim 16 wherein the step of recording tracks parallel to the edge of the tape includes the step of recording two wide response audio channels, one narrow response audio channel, one control track channel and one address code channel.

18. An article of manufacture comprising a magnetic recording tape having a latitudinal width of about 2 inches, said tape having a plurality of information bearing areas and blank guard band areas, said information bearing areas and blank guard band areas arranged as follows fron one longitudinal edge of the tape to the other: a substantially 5 mil guard band parallel to said longitudinal edge, a substantially 50 mil audio track parallel to the longitudinal edge, a substantially 20 mil guard band parallel to the longitudinal edge, a substantially 20 mil audio track parallel to the longitudinal edge, a substantially 20 mil guard band parallel to the longitudinal edge, a substantially 50 mil audio band parallel to the longitudinal edge, a substantially 10 mil guard band parallel to the longitudinal edge, an area of about 1.755 inch latitudinal width parallel to said longitudinal edge having a plurality of parallel substantially 6 mil video tracks spaced by substantially 3 mil guard bands all forming an angle of about 19.55° to the longitudinal tape edge, said video tracks each having a length of about 5.24 inches, a substantially 10 mil guard band parallel to said longitudinal edge, a substantially 20 mil control track parallel to said longitudinal edge, a substantially 15 mil guard band parallel to said longitudinal edge, a substantially 20 mil address code parallel to said longitudinal edge and a substantially 5 mil guard band parallel to said longitudinal edge.

* * * * *